(12) United States Patent
Hampel et al.

(10) Patent No.: US 11,046,458 B2
(45) Date of Patent: Jun. 29, 2021

(54) DEVICE FOR LIGHTING THE TAKE-OFF AND LANDING RUNWAYS AND THE TAXIWAY AT AIRPORTS

(71) Applicant: iAd Gesellschaft für Informatik, Automatisierung und Datenverarbeitung mbH, Großhabersdorf (DE)

(72) Inventors: Hermann Hampel, Großhabersdorf (DE); Johannes Hampel, Großhabersdorf (DE); Markus Pieger, Forchheim (DE)

(73) Assignee: iAd Gesellschaft für Informatik, Automatisierung und Datenverarbeitung, Großhabersdorf (DE)

( * ) Notice: Subject to any disclaimer, the term of this patent is extended or adjusted under 35 U.S.C. 154(b) by 0 days.

(21) Appl. No.: 16/836,397

(22) Filed: Mar. 31, 2020

(65) Prior Publication Data
US 2020/0231301 A1    Jul. 23, 2020

Related U.S. Application Data

(63) Continuation of application No. PCT/EP2018/025264, filed on Oct. 9, 2018.

(30) Foreign Application Priority Data
Oct. 9, 2017  (DE) .................... 10 2017 009 323.7

(51) Int. Cl.
*B64F 1/20*   (2006.01)
*F21S 8/02*   (2006.01)
(Continued)

(52) U.S. Cl.
CPC .............. *B64F 1/205* (2013.01); *F21S 8/022* (2013.01); *F21V 5/02* (2013.01); *F21V 7/00* (2013.01);
(Continued)

(58) Field of Classification Search
CPC ... F21S 8/032; F21S 8/03; F21S 8/022; B64F 1/20; B64F 1/205
See application file for complete search history.

(56) References Cited

U.S. PATENT DOCUMENTS 4,860,182 A * 8/1989 Vadseth .................. F21S 8/022
                                                                  362/364
6,669,351 B1 * 12/2003 Shea ......................... B64F 1/20
                                                                  362/153.1
(Continued)

FOREIGN PATENT DOCUMENTS

CH          468593 A     2/1969
DE       19750560 A1    5/1999
(Continued)

*Primary Examiner* — Andrew J Coughlin
(74) *Attorney, Agent, or Firm* — Rankin, Hill & Clark LLP

(57) ABSTRACT

A light suitable for lighting take-off and landing runways and taxiways of airports that includes a housing cover provided with a light passage opening, an optical system including at least one light-emitting diode module with at least one LED-chain having a plurality of light-emitting diodes as light sources, a reflector, and a prism having a shape complementary to that of the light passage opening, an insert and a sealing ring, which is arranged between the housing cover and the insert. On an underside of the housing cover of the light, the at least one LED module and reflector are arranged in a first chamber, which is separated from a second chamber of the light by a seal including a flexible (Continued)

insulating and heat-conducting film arranged between the reflector and the underside of the housing cover.

15 Claims, 17 Drawing Sheets

(51) Int. Cl.
| | | |
|---|---|---|
| *F21V 5/02* | (2006.01) | |
| *F21V 7/00* | (2006.01) | |
| *F21V 17/06* | (2006.01) | |
| *F21V 19/00* | (2006.01) | |
| *F21V 23/02* | (2006.01) | |
| *F21V 23/04* | (2006.01) | |
| *F21V 31/00* | (2006.01) | |
| *F21Y 115/10* | (2016.01) | |
| *F21W 111/06* | (2006.01) | |

(52) U.S. Cl.
CPC .......... *F21V 17/06* (2013.01); *F21V 19/0055* (2013.01); *F21V 23/02* (2013.01); *F21V 23/0457* (2013.01); *F21V 31/005* (2013.01); *B64D 2203/00* (2013.01); *F21W 2111/06* (2013.01); *F21Y 2115/10* (2016.08)

(56) References Cited

U.S. PATENT DOCUMENTS

| | | | |
|---|---|---|---|
| 7,201,490 B1 * | 4/2007 | Bieberdorf | B64F 1/20 362/153 |
| 7,988,316 B2 * | 8/2011 | Reinert, Sr. | E01F 9/559 362/153.1 |
| 9,606,285 B1 * | 3/2017 | Lindblad | G02B 6/0091 |
| 2003/0048634 A1 * | 3/2003 | You | F21V 5/02 362/153.1 |
| 2004/0232624 A1 | 11/2004 | Hisano et al. | |
| 2012/0140458 A1 * | 6/2012 | Krogman | F21V 5/04 362/184 |
| 2012/0287602 A1 * | 11/2012 | Urano | F21V 7/05 362/84 |
| 2013/0249375 A1 * | 9/2013 | Panagotacos | F21V 23/005 313/13 |

FOREIGN PATENT DOCUMENTS

| | | | | |
|---|---|---|---|---|
| DE | 10144929 A1 | | 4/2003 | |
| DE | 20309405 U1 | | 10/2003 | |
| DE | 102008049553 A1 | | 4/2010 | |
| DE | 102008054203 A1 | | 6/2010 | |
| FR | 2790443 A1 | | 9/2000 | |
| KR | 2020055219 A | * | 5/2020 | .............. E01F 9/582 |
| WO | 9903729 A1 | | 1/1999 | |
| WO | 2013170894 A1 | | 11/2013 | |

\* cited by examiner

- 0 to 7 references to the number of dots
- dot 0 to 3 references to side A
- dot 4 to 7 references to side B
- screw

DEVICE FOR LIGHTING THE TAKE-OFF AND LANDING RUNWAYS AND THE TAXIWAY AT AIRPORTS

CROSS-REFERENCE TO RELATED APPLICATIONS

This application is a continuation of International Application No. PCT/EP2018/025264, filed Oct. 9, 2018, and claims priority to DE 10 2017 009 323.7, filed Oct. 9, 2017.

BACKGROUND OF INVENTION

Field of Invention

The invention relates to a device for lighting take-off and landing runways as well as the taxiway on airports, comprising a plurality of lights, each of which has a housing cover with a light passage opening, as a light source at least one light-emitting diode and a prism designed to be complementary to the shape of the light passage opening as an optical system and a sealing ring arranged between the housing cover and an insert fastened thereto.

Brief Description of Related Art

Electrical devices with series circuits, in particular in airfield lighting and in street lighting, have been known for a long time in the technical field of lighting technology. Lighting installations in airports serve to conduct aircraft at the start, during landing and during rolling of the aircraft on the airport, above all at night and poor visibility. These are lighting elements, such as the markings of the take-off and landing runways, the approach lighting, glide angle lighting, threshold lights, take-off and landing lights, taxiway lights, characteristic lights, hazard lights, obstacle lights, and the markings and deflectors on the airport aprons and runways. At large airports, such lighting systems extend over several kilometers, so that correspondingly extended cable networks are required. In order not to be confronted with disturbing power drops despite the mileage long lines, series circuits are mostly used, wherein the supply of the lighting means is decoupled from the series cable by means of lamp transformers in order not to interrupt the series circuit in the event of a failure of a lighting means. Furthermore, the supply of the series cable is carried out jointly centrally by means of constant current regulators, so that light signals with fluctuating brightness, in particular by failure of lighting means, are avoided. Furthermore, automatic lamp failure detection is frequently used in the airport region.

A method and a device for signaling lamp failure and for keeping constant the series circuit of lighting installations on airports or the like is known from DE 197 50 560 A1. The consumer circuit with series-connected lamp transformers for supplying the lamps is a secondary-side series circuit of a feed transformer, which is regulated by means of a constant-current regulation having a higher-level control. The actual current in the secondary-side series circuit and the actual voltage on the primary side of the feed transformer of the secondary-side series circuit are measured and in each case a corresponding measurement signal is fed to the higher-level control. In the higher-level control, a value corresponding to the inductance of the secondary-side series circuit is determined from a measurement signal corresponding to the actual current in the secondary-side series circuit and a measurement signal corresponding to the actual voltage on the primary side of the feed transformer. Furthermore, the value determined for the inductance of the secondary-side series circuit is compared with comparison values stored in the higher-level controller for the inductance of the secondary-side series circuit, which have been determined when the secondary-side series circuit is completely intact and in operation and when one and/or more lamps of the secondary-side series circuit are switched off. In this embodiment, the higher-level control of the constant-current control additionally takes over the measurement and evaluation tasks of a lamp failure monitoring. During operation of the constant-current regulation or series circuit, an integral lamp failure value calculated from at least three comparison inductance values by linear inter- and extrapolation for each current stage can then be assigned to the inductance determined during this operation. Furthermore, in the on-site operation by means of a decentralized controller device (i.e. individual lamp controller), the lamps of the lighting system or the centrally arranged feed transformer, the secondary side of which has an overvoltage protection or lightning protection, can be switched on and off.

In addition, individual lamp controllers for lighting systems on airports and the like are known. For example, DE 101 44 929 A1 discloses a single lamp controller with individual lamp control modules, which in each case control the operation of lamps of the lighting system and are connected via lamp transformers to a series circuit of the lighting system, and having a lighting control system to which the individual lamp control modules are connected. In order to achieve as optimum data coupling as possible with as little signal attenuation as possible during data traffic between the lighting control system and the individual light control modules, a separate data connection is proposed, by means of which the individual light control modules are connected to the lighting control system. In addition, each individual lamp control module has a power channel, which is connected on the input side to the lamp transformer via a FAA-connector and on the output side to the lamp via a FAA-connector. Furthermore, an overvoltage protection element is arranged in the power channel of each individual lamp control module on the input side to the series circuit and on the output side a lightning protection element to the lamp. Furthermore, each individual light control module has a signal detection element in the control channel, by means of which signal detection element the lamp state, in particular the lamp current can be detected. Finally, each individual light control module has, in the control channel, a microcontroller, by means of which the power section of the power channel can be controlled and both message and measured value data can be provided by the signal detection element. The microcontroller of the control channel controls the power section of the power channel in such a way that the lamp is switched on and off via a switching ramp. The lamp state can be controlled by means of the microcontroller of the control channel after the series circuit has been switched on until the first telegram is received and in the event of a failure of an optical waveguide LWL-bus depending on a set parameterization of the individual light control module. In such a single lamp controller, the operating state of the lighting means is permanently detected and monitored. In the case of an illuminant failure, the microcontroller will notice this and then short-circuits the lamp transformer. In this way, dangerous high peaks are eliminated. However, this method presupposes a communication channel via which the microcontroller can report the failure of the lighting means, it being ensured that failure of one or more lighting means does not lead to the failure of an entire series circuit.

Furthermore, WO 2013/170 894 A1 discloses a lamp emulation circuit for AC-fed airport lighting systems for simulating (emulating) the failure of an LED lamp. More specifically, the lamp emulation circuit is inserted between a lamp transformer and the LED lamp circuit. The lamp transformer is connected in series with its primary winding to a constant current supply and supplies a lamp current at its secondary winding. Furthermore, the lamp emulation circuit has means for measuring the voltage at the secondary winding of the lamp transformer and further means for switching off the LED lamp circuit from the lamp transformer if the voltage at the secondary winding of the lamp transformer exceeds a predetermined value. In particular, the lamp emulation circuit comprises a rectifier connected to a filter to determine the voltage across the lamp transformer. Said lamp transformer is also connected to a relay coil which opens a contact for separating the LED lamp circuit from the lamp transformer when the voltage across the lamp transformer exceeds a predetermined value. A failed lamp is emulated (simulated) by completely disconnecting the LED lamp circuit from the lamp transformer. When the LED lamp circuit is disconnected from the lamp transformer, the lamp transformer does not have a load on its secondary side and thus goes into saturation as it would make with an off lamp. Therefore, lamp fault detection means as are known in the art reliably detect failure. In one embodiment, a reset switch is connected in parallel with the secondary winding of the lamp transformer. Preferably, it is a spring-loaded, normally open switch, which can be manually actuated to close its contact and thus cause a short circuit of the secondary winding of the lamp transformer. This leads to a resetting of the lamp emulation circuit.

In order to provide a lighting device, the lighting units of which can also be automatically monitored for their actual transmission of light when light-emitting diodes are used as light sources, a lighting device is proposed in DE 10 200 8 049 553 A1, in which the lighting units each have a measuring device for detecting externally incident light, wherein the measuring device of the second lighting unit is designed in such a way that it detects light emitted by the light source of the first lighting unit. By arranging the measuring device for light emitted by a first lighting unit outside said lighting unit, the actual light output from the lighting unit is measured by the measuring device. For this purpose, the proportion of the light generated by the light source, which then optionally passes through optical components of the first lighting unit, and which finally arrives at the location of the measuring device after leaving the first lighting unit and is received by the latter, is measured. The location of the measuring device is that of the second, for example the adjacent lighting unit. In this way, by means of a multiplicity of identical lighting units with an integrated measuring device, a lighting device can be installed which has a chain of mutually monitoring lighting units. The actual light emission is monitored automatically, i.e. without the need for maintenance personnel operating at the location of the lighting unit and without the use of additional mobile measuring devices. In a preferred embodiment, the measuring device has a light sensor for determining the intensity and/or color of the incident light, which is connected upstream of an optical device for bundling and/or filtering the light incident from outside. The light sensor can be designed as a photodiode, a photoresistor, a photocell or the like and is set to the wavelengths of the light to be measured, which is emitted by the light-emitting diode of the first lighting unit. The optical device bundles the received light so that a measurement signal of sufficient intensity is generated; furthermore, it filters the received light so that as little extraneous light as possible falls on the light sensor. Furthermore, the light source has a group of single-color or variously colored light-emitting diodes. As a result, light of different brightness and/or color can be generated. With one group of monochrome light-emitting diodes these provides redundancy to the light source, so that, in the event of failure of individual light-emitting diodes, a change of the light source or of the lighting unit does not necessarily have to take place, since the failure can be compensated by adjusting the brightness of the still intact light-emitting diodes. A group of differently colored light-emitting diodes can be used to mix differently colored light from the lighting unit by targeted actuation of the light-emitting diodes. Thus, the ease of maintenance of lighting devices is increased and the diversity of types of lighting units is reduced. Furthermore, the lighting units each have an optical device for beam shaping the light emitted by the light source. The light generated by the light source passes through an optical device, which can comprise lenses, mirrors and prisms, in order to be shaped into a beam with properties predetermined by standards with regard to its spatial-angle-related intensity distribution. Furthermore, the lighting units each have a control device having a light sensor for detecting the intensity and/or color of the light emitted by the light source thereof and having a control unit connected thereto for controlling the light source. This internal photometric sensor measures the light directly after its generation by the light-emitting diodes with regard to its color and brightness, i.e. before the light leaves the lighting unit and, if appropriate, before the light passes through the optical device. On the one hand, these results in an additional monitoring possibility for the light to be emitted, on the other hand, the measured values are fed to the control device, in which, after a desired-actual comparison via the control device, the energization of the light-emitting diodes can be controlled in order to regulate brightness and color. Furthermore, the lighting units each have a supply unit, which are connected to a central energy supply device via a line in order to supply energy. The supply units are used to supply voltage to the respective lighting unit and are coupled to a central energy supply device via a two-wire line. The lighting units preferably each have a communication unit, which are connected to a central communication device for data transmission. The measured values of the measuring devices and of the regulating devices are transmitted to the central communication device via the communication units in the lighting units. In this way, two different measured values can be centrally compared with one another and with a balanced operating state via the emitted light of a lighting unit. This allows malfunctions in the light exit to be detected automatically by defects or soiling, with identification of the number and installation location of the relevant lighting unit. A corresponding status message can be generated in the central communication device for maintenance purposes. Since the communication is bidirectional, commands can be sent from the central communication device to the lighting units for the on- or off-switching or for setting the brightness or color. The communication units of the lighting device are preferably connected to the central communication device via the power supply line in order to form a field bus for data transmission. If high-frequency data signals are also transmitted via the two-wire line, which is used for transmitting electrical energy to the lighting units, line lengths of at least up to 10 km at up to 200 km can be implemented for the data communication. This makes it possible to use low-voltage cables of the class below 1.000 V. The use of low-voltage lines and components has considerable safety and cost advantages over the known high-voltage cables with operating voltages of up to 5.000 V with test voltages of up to 20 kV. In particular, the light sources are each designed for the continuous or intermittent emission of light and the measuring devices for the detection thereof. Thus, as lighting devices, both continuously burning lights in ground or overhead construction and also flash lights in traditional high-voltage technology, wherein the light sensors are to be adapted to the relevant wavelengths of the emitted light, and also in light-emitting diode technology, can be used. In detail, each lighting unit has a pot-shaped housing, which is let in centrally into a depression provided in the runway and is closed in a pressure-tight manner at the floor level by a lid. Arranged in the housing is a light source which has light-emitting diodes and emits light of a predetermined color and brightness. The light emitted by the light source passes through an optical device which has, for example, a prism, on the base of which the light emitted by the light source enters and through the front side of which the light emerges to a beam with a defined intensity distribution related to the spatial angle. The light is emitted at a flat angle against the horizontal in order to mark the center line of the runway even in poor visibility conditions, in particular at night, for the orientation of a pilot located or rolling in the landing approach. The color and the brightness of the light emitted by the light-emitting diodes is measured by means of a photometric sensor element of a control device arranged in the housing and, if required, that is to say when there is a deviation from a desired operating state, can be adjusted by means of a control device belonging to the control device. By means of the control, individual light-emitting diodes, whose original lighting properties have changed by the operator, can be compensated for by means of suitable pulse width modulation of the energization of the intact light-emitting diodes. In a group of light-emitting diodes of different colors, the color of the emitted light can be adjusted by means of the control device. The electrical loads of the lighting units are supplied with current by supply units, which are connected to a central energy supply device via a line for transmitting electrical energy. Furthermore, the lighting units comprise communication units, which are coupled to a central communication device for bidirectional data transmission. In the case of lighting units, which have optical devices for light emission in two directions, the sensory detection of the light emission of the respectively adjacent lighting unit is carried out via a measuring device, which is integrated in the prism facing the lighting unit to be measured. In overhead lights, the sensory detection of the light emission of the respectively adjacent, rear light in the direction of flight is carried out by means of a measuring device which is integrated in the rear side of the front light in the direction of flight. The measuring device can be used both for continuously burning lighting units in ground or overhead construction and for flash furnaces in traditional high-voltage technology with an adapted sensor system for the relevant wavelengths of the emitted light or else in LED technology.

In order to provide a flying-field lighting device, the lighting units of which can be monitored for their actual transmission of light and thus to the sufficient brightness of the optical signal emitted to an aircraft driver, in a further development a flying-field lighting device is known from DE 10 200 8 054 203 A1, in that the monitoring device has at least one video camera for recording a digital video image of the at least one lighting unit. In this way, a detection system, which is cost-effective and powerful for the functional control, is available, which detects the optical signal momentarily emitted by the lighting unit. As a result of the recording of a lighting unit, it is detected at each point in time whether a signal at all, and if so, in which brightness and/or color it is actually emitted. The detection of the actual state, which can be perceived from the outside, represents the basis for the function control, without having to know the cause of a possible malfunction. Video cameras are suitable for recording, under a wide variety of recording conditions, for example in the case of sun, in the case of precipitation or at night-digitally evaluable video images of light signals, for example overhead lights or ground lights, but also of information boards. The monitoring device can be used in addition to known fault detection circuits or instead of those in order, in one case, to provide a redundant system for fault detection and in the other case a cost-effective. Finally, the monitoring device is of modular construction, since video cameras can be installed successively on the airfield; first, for example, high safety-relevant flight field segments, such as approach lighting, take-off/runway lighting and stop-line lighting, could be monitored in order to monitor further flight field segments, such as the rolling paths, the forward field and other ground movement regions, in a later stage. In the flying field lighting device, the at least one video camera is arranged and oriented in such a way that the recorded video image has a group of a plurality of lighting units. By monitoring a group of several lighting units, the number of video cameras used can be kept small. In addition, an overview of a group of functionally interconnected lighting units, for example the entire approach lighting or the entire lighting of a stop line can thereby be obtained. The at least one video camera is arranged and oriented in such a way that the video image of the one or more lighting units can be received approximately from the viewing direction of the aircraft driver. In this way, the recorded video image forms the view of a pilot on the lighting units, which are to emit the optical signals to the latter. The function control thus takes place from the point of view of the observer for which the light signals are intended. The monitoring device preferably has an evaluation device, in which the video images, with regard to a brightness level, which can be perceived from the outside of lighting units, are recorded. For this purpose, the evaluation device comprises storage means in which reference images with lighting units of different adjustable brightness levels are stored. The evaluation device further comprises comparison means for digitally comparing recorded video images with a reference image. The selection of the correct reference image takes place by the recording time of the video image supplied by the video camera, because the recording time specifies which brightness level was predetermined or switched by the control center. The monitoring device preferably has a display device for reproducing recorded video images, which display device is connected to the evaluation device in such a way that the reproduction of a currently recorded video image takes place automatically as soon as a determined brightness level deviates from the adjusted brightness level for a lighting unit. The display device can, for example, be arranged centrally, for example in the control tower or in a maintenance station of the airport. A video image is then automatically reproduced by the display device and thus the control or maintenance personnel are given knowledge if at least one of the recorded lighting units does not emit an optical signal or an optical signal, which does not correspond to the brightness state set by a control center in color and/or brightness. The display device of the lighting device is preferably designed for reproducing a total image composed of a plurality of video images recorded by different video cameras. Thus, by means of the central display device, both the temporal progression of one and the same lighting section and in an overall representation a plurality of simultaneously recorded video images can be reproduced. Important maintenance instructions can be obtained by the temporal development of the brightness of a specific lighting unit. In addition, the overall overview of a plurality of lighting units forms an important decision basis for possible shift interventions of the control personnel.

In order to provide a ground light which can be constructed to be small, has a longer service life and can be serviced more easily, a ground light is known from DE 203 09 405 U1, in which at least one light-emitting diode (LED) is provided as the light source. The holder is arranged in a closed housing, which contains a light passage opening and an optical system. The housing is arranged in an upwardly open recess of the cover part, preferably fittingly received in the recess, wherein the upper side of the housing forms a part of the transferable upper side of the cover part. The housing accommodating the optical system and at least one LED can be designed as a module, which can be used for a wide variety of ground lights, for example in a single or multiple arrangements. For example, in a multiple arrangement, two housings are accommodated on opposite sides of a partition in corresponding recesses and have an emission direction to opposite sides at a predetermined angle to the ground. The upper side of the housing forms part of the upper side of the cover-like closure for the ground light. The upper side of the housing is preferably planar, the upper side of the cover part, following the housing, sloped off to the edge in order to form a soft transition for the wheel to be driven. The exit of the beam from the housing via the light exit opening is supported within the cover part, wherein the light beam can exit at a predetermined angle via a depression in the cover part. In this way, a gap is formed, in the region of which the wheel to be driven does not experience any support. However, this gap is relatively narrow, so that no danger of the housing or its optics and the LED takes place when driving over. According to one embodiment of the invention, the housing is cuboid, wherein the light outlet opening is provided, for example, in a bevel of the upper side of the housing, and the light passage opening is capable of fitting a prism as optics. According to another embodiment, the housing is preferably formed from a lower housing part and an upper housing part, which can be connected to one another in a fixed and sealed manner, for example by screwing, gluing or by welding. According to a further embodiment, the housing is preferably fastened in the recess of the cover part by screwing. This fastening preferably provides the arrangement of screws on the underside of the cover part, so that no moisture can penetrate into the interior of the housing via screw holes. In the installation of a ground light according to DE 203 09 405 U1, the housing can first be prefabricated with mounting, the prism and LED being mounted and then housing upper and lower housing lower parts being connected to one another (in that seals are let into the abutting surfaces). The lower housing part receives a feed-through for a cable for supplying the at least one LED. A shaped part, which provides a supply of the LED with the desired voltage and the desired current, is preferably accommodated in the pot-shaped insert, the upper edge of which terminates with the plane of the base (i.e. in the interior below the cover part). The pot-shaped insert provides sufficient space for a sufficient length of cable, which permits lifting of the cover part together with the (two) housings (with LED and optics, preferably prism) introduced into recesses of the cover part from the pot-shaped (cylindrical) insert before a plug-in connection for the supply line is separated. A cylindrical section of the cover part, which is smaller in diameter, is inserted into the insert in a fitting manner and is sealed by means of a seal, which is embedded in an annular groove. The at least one LED is preferably mounted on a commercially available board and is also provided with suitable optics. A printed circuit board equipped in this way is preferably fixed in the lower part of the housing by means of a screw connection, for example screwed against the front side of the rear wall of the lower housing part. The prism in the housing is geometrically adapted to the conditions of the ground light, in particular is elongated and is held with the aid of a frame which is fixed in the housing. Alternatively, the prism has a circumferential shoulder which bears against a circumferential shoulder in the light outlet opening, the frame ensuring that the shoulders remain in engagement with one another. A distance is maintained between the frame or the prism and the at least one LED, said distance preventing damage to the LED in the event of slight deformations, which can occur when the ground light is travelling over.

Furthermore, the non-prior-published application DE 10 201 6 011 815.6 of the applicant describes an operating device with staggered overvoltage and overcurrent protection and an antenna for controlling intelligent lighting means and devices. The entire content of the non-prior-published application DE 10 201 6 011 815.6 will be explained by reference to the content of this application. In detail, the protection consists of different circuit regions which are staggered in succession and matched to one another, wherein each of these circuit regions assumes different tasks for the protection.

The first embodiment of the operating device according to the invention has both a first branch for the connection of a lighting means (with a protection of the power supply) and a second branch (with a protection, in particular a powerline coupling) for the connection of at least one communication module of a device to separate first and second interface circuits at the output of the operating device.

Arranged at the input of the operating device is a coarse protection circuit, which is common to the first and second branches and which has a gas arrester and, in series with the gas arrester, two varistors and protects the system against large pulses. In this case, overvoltages are limited to a lower voltage and the pulse at the input of the system is short-circuited. For overvoltage and overcurrent protection, a network filter connected to the output of the coarse protection in the first branch has the task of delaying, reducing and folding the voltage pulse limited by the coarse protection for subsequent circuit parts and reducing the slew rate (see in detail the four tasks described below to the network filter). If the residual voltage of the pulse for the subsequent circuit parts is too high after the mains filter, the latter is limited by a clamping circuit which is connected to the output of the mains filter and consists of the first stage of fine protection and in the second stage of a first energy absorber. In this case, the fine protection activates the first energy absorber and a short circuit of the voltage pulse occurs in order to protect the subsequent circuit parts from damage. When the next zero-crossing of the mains voltage is reached, the short circuit is deactivated again. Upon further response of the fine protection, a renewed activation of the first energy absorber takes place.

Furthermore, a second energy absorber is connected in the first branch at the output of the clamping circuit, which second energy absorber limits the current when switched on with the aid of an NTC resistor NTC (negative temperature coefficient thermistor, heat conductor). This protects the circuit before high currents and at the same time relieves the supply network. In normal operation, the resistor NTC is bridged in order to minimize the power loss. If the second energy absorber detects an overvoltage pulse, this bridging is cancelled again. As a result, the internal resistance of the circuit is increased and the energy, which occurs in the following circuit parts, is reduced. Furthermore, the second energy absorber acts as a switch-on current limitation.

The powerline coupling in the second branch couples the communication signals of a powerline coupling directly to the power supply lines. For this reason, only the coarse protection protects the coupling, but not subsequent protective devices. Due to the clamping voltage of the coarse protection whose value would still cause damage to the coupling circuit, the circuit requires additional protective measures. To this end, at the output of the coarse protection in the second branch, a medium protection is connected to a transformer, which goes into saturation during the overvoltage pulse. The saturation effects of the transformer bring about a greatly restricted transmission of the pulse energy to the secondary side of the transformer. In addition, components, namely a first fine protection circuit, a filter connected thereto for separating communication signals fed into the power supply network in parallel, and a second fine protection circuit, which is connected to said filter and which limit the remaining voltage pulse are located on the secondary side. According to the invention, the first fine protection circuit of the powerline coupling is connected to the secondary side of the transformer, which protects fault-sensitive components of the circuit, in particular all inputs of a microprocessor, additionally by voltage-limiting components (clamping diodes).

In order to protect the output stage of the operating device/ballast from overvoltages and overcurrent, which act on the ballast by the lighting means, the first interface circuit is provided with corresponding limiting circuits. In order to protect the ballast, the second interface circuit also has overvoltage protection and overcurrent protection (see second fine protection circuit connected upstream). By means of the staggered protective measures, effective protection of the entire operating device/ballast is ensured. The mode of operation of the protective devices is dimensioned in such a way that the respective devices effectively protect all subsequent circuit parts this means from primary and secondary.

In order to ensure the distance between phase and earth conductor or neutral conductor and earth conductor of 4 mm, required from a standard for reliable electrical isolation, an additional thermal fuse is implemented at the earth conductor connection point of the gas arrester. As a result, two thermal fuses each having a 2 mm separation distance are connected in series in each path. All thermal fuses are thermally coupled to the varistors 2. As a result, the leakage current of the varistors 2, which is increased at the service life, is detected.

The network filter NF arranged in the first branch assumes four tasks in the operating device/ballast:

Firstly, in the case of an overvoltage or overcurrent pulse, the terminal voltage which remains at the output of the coarse protection circuit is folded (the energy time distribution is changed/delayed in the time domain by the properties of the network filter) and the pulse is passed on to subsequent circuit parts in a delayed manner. The convolution of the voltage pulse causes a reduction in the peak value in the event of a simultaneous lengthening of the pulse. The delay of the pulse ensures that the lightning protection responds as a first measure in the event of an overvoltage or overcurrent event. This results in the reduction of the main energy of the pulse at the coarse protection.

The second task of the network filter is a filtering of the common-mode interference and push-pull interference generated by the system, e.g. in the internal power supply and in the lamp drive.

The third task of the network filter is the generation of a high impedance for the powerline communication signals fed in parallel into the network. The communication via power lines takes place in a frequency range between 30 kHz and 500 kHz. This frequency range does not require the high impedance to short-circuit the communication signals or greatly attenuate low impedance. High impedance enables good signal transmission from the network to the coupling circuit and vice versa.

The fourth task of the network filter is to protect the first energy absorber from rapid current rise speeds resulting from the short-circuiting of an overcurrent pulse.

In a preferred embodiment of the network filter according to the non-prior-published application DE 10 201 6 011 815.6 of the Applicant, the network filter is a 4-order LC filter with low-pass behavior. The corner frequency (−3 dB) is fixed at 2 kHz. The mains filter is insulated from the earth potential/earth conductor. The insulation prevents powerline communications from being coupled into the earth potential/earth conductor. It is also prevented that disturbances on the earth potential/earth conductor influence the power-line communication PLC.

In addition, protection against temporary overvoltage is present. The operating device is intended to detect overvoltages caused by mains faults and disconnect the input connection from the mains in order to protect the downstream components from overvoltage. As soon as the overvoltage fault is released, the operating device switches the input back to and the proper operation is continued. A relay which is looped in the phase is preferably used as a switch-off or switch-on.

For communication, the operating device/ballast preferably has a powerline communication interface which is suitable for the following tasks:

Control of the operating device/ballast (lighting means on-off, off-off and dimming, etc.), Querying status messages of the operating device/ballast, Initialization of the parameters of the lighting means, and Update of the firmware of the operating device/ballast.

In addition to powerline communication, further communication interfaces may be available. All of these interfaces serve for the following tasks:

Control of the ballast (lighting means on-off, off-off and dimming, etc.),

Querying status messages of the ballast,

Initialization of the parameters of the lighting means,

Update of the firmware of the ballast, and

Connection of external devices (e.g. monitoring camera, motion detector, sensors and actuators, etc.).

The operating device/ballast can operate as a gateway between the individual communication interfaces (e.g. between WLAN and power line). It is thus possible to connect different network topologies to one another. The communication ranges increase as a result of such a connection of different networks.

The compact housing ensures a large number of connection and system variations of the operating device/ballast. The different variations of the housing construction make possible a simple, cost-effective production without additional costs and a complex solution. The construction also enables simple and rapid assembly of the components (e.g. the equipped printed circuit boards, heat sinks and partitions) of the operating device/ballast into the housing. In addition, the housing fulfils all valid specifications against direct contact and penetration of liquids and very small particles.

The housing of the operating device/ballast consists of two symmetrical half-shells (not shown in the drawing), which are connected or closed by means of snap-action technology, i.e. by bringing together a plurality of snap closures. This results in a simple and reliable assembly. The snap closures of the half shells are located outside the sealed area.

The housing is designed in such a way that, depending on the field of application, various assemblies (controller board with microprocessor MP, different ballast control and communication modules) can be installed therein. Flat and lateral fastening bores in the projection of the half-shift enable variable installation positions of the device.

Depending on the cable entry (by means of cable gland or grommet) and type of casting (filled casting compound), a protection type of up to IP68 can be achieved. The casting of an assembly in a half-shell can be carried out variably in steps (1 to 4 steps). As a result, the amount of casting compound can be minimized depending on the design of the assembly used and optimized for the protection thereof. Optionally, the entire housing can also be cast, although more potting compound is necessary, but the production effort is reduced.

The half-shells have a groove in the side walls. In this case, a sealing cord can optionally be inserted in order to achieve a tightness of the housing. In this case, casting can be dispensed with.

By means of cooling plates inserted in the housing, efficient heat management for components with higher heat development is carried out by optimized heat output to the environment. In addition, to compensate for different component heights, it is also optional to insert cooling blocks into the housing. By using a heat-conducting foil, which is adhesively bonded to the outer side of the housing, in a depression impressed in the half-shells, the heat output can be further improved by a direct thermal coupling to the fastening carrier taking place at this point.

In order to achieve improved EMC shielding by means of potential connection, the cooling plates can be connected to the printed circuit boards by means of a threaded bolt and a screw. Optionally, a potential separation or bond between protective earth (on the network input side) and the functional earths (on the lighting means and interface side) can take place.

Guides for the connecting plugs are incorporated in the half-shells, as a result of which the correct alignment of the assemblies (controller board and possibly communication module or ballast control) in the respective half-shell is ensured. Since this also results in a tolerance compensation of the printed circuit board production, a further fastening of the assemblies and plugs is not required. The guides are leading, so that an alignment is likewise effected between the two half-shells.

The half-shells result in a functional separation of the device: a half-shell contains the controller board with a microprocessor and optionally a universal interface for additional variants of communication modules. The other half-shell contains the ballast control, the model of which is dependent on the power class of the lighting means used. This function separation makes possible a simple adaptation of the ballast to the lighting means, power classes, potential separation and protection class to be used, as well as a simple and efficient (rapid) repair with optimized replacement partial posture for the devices.

Up to eight status displays/display means (SMD LEDs) can, for example, be installed directly on the printed circuit boards, since the light line is made directly to the housing outer wall by simple light pipes in the potting compound. For this purpose, guide rings and depressions in the housing wall are located in the housing half-shells at the points where the light pipes meet the housing half-shell. By means of these depressions, a better visibility of the status displays is provided. The guide rings serve for the light conduction and adjustment of the light pipe and at the same time for protection against unintentional inflow of the potting compound into the light channel.

Furthermore, in the non-prior-published application DE 10 201 6 011 815.6 of the applicant in a second embodiment of an operating device/ballast according to the invention is integrated an LED lamp for 230V/115V with electronics in the lamp base, for example an E-thread of a commercially available incandescent lamp, for realizing an overall device. The overall device integrates an LED lamp and a gateway, the electronics necessary for the lamp function being contained in the device for the operation of the LEDs. The overall device consists of a "luminous body" and a device foot with a connecting socket (E-thread and foot contact). In the upper lamp part with the protective cap, the LEDs and an optical system for light distribution (diffuser) and sensors (in particular brightness, color) are contained, the lower part contains the entire electronics, both for the LED control and for the PLC and BLE communication. This spatial arrangement reduces the temperature influence of the electronics. The space located there between is preferably used for a Bluetooth receiver and balun and an antenna, wherein the housing shape makes it possible to realize a corresponding opening angle of the angled dipole in a surprisingly simple manner. For the radio system of the overall device, an efficient antenna is required, which nevertheless covers as far as possible all spatial regions equally and is therefore not intended to have any directivity. For this purpose, a printed circuit board antenna is used in the housing as an angled dipole having at least one structural element, in particular additional pins, which expands the antenna into the third dimension. By means of the pins, a homogenization of the directional characteristic is achieved; the broad conductor tracks ensure a sufficient usable bandwidth, but also for a higher tolerance to environmental influences.

BRIEF SUMMARY OF THE INVENTION

As the above assessment of the prior art shows, operating devices for controlling various lighting means have been known for a long time, with a multiplicity of different types of ground lights and overhead lights also being used in the airport area. In particular, the various airports for the problem of maintenance under tension have previously developed different approaches and procedures. In the case of individual lamp control, the controller detects the failed lamp at the high voltage peaks in situ and immediately short-circuits the lamp. It is noted that the lamp has failed and reports this via the communication channel of the higher-level control. Thus, the location and the amount of all lamps are known. However, it can be determined that it is currently lacking on a light in conjunction with the electronics, which resists the rough external influences and thereby permits safe and long-lasting operation at the airport.

Examples of the external influences/environmental influences are:
Weather influences (rain, snow, ice, temperature),
Mechanical stress (for example snow plough, impact load aircraft, . . . ),
Chemical stress (e.g. kerosene, de-icing agent, acid, oils, . . . ),
Electrical influences (e.g. lightning strikes, overcurrent, overvoltage, mains flicker (electrical voltage fluctuations in the power supply network, . . . ), and
Optical influences (e.g. extraneous light, . . . ).

The invention has for its object to further design a universally usable, flexible and highly integrated operating device for controlling various lighting means described in the non-prior-published application DE 10 201 6 011 815.6 in such a way that, on the one hand, various types of lighting means, for example LED, HQI (halogen-metal vapour lamp in quartz technology), NDL (sodium vapor lamp), etc., are supported and, on the other hand, the latter can be operated in different power classes with high efficiency. By means of suitable structural measures in conjunction with the electronics, a simple construction and assembly technique is to be achieved, which ensure an economically efficient and robust product.

This object is achieved in that a first chamber and a second chamber are arranged on the underside of the housing cover of the light, in that the two chambers are separated by an optical unit which projects beyond the earth's surface when installed, comprising at least the one LED module and a reflector, and in that a seal of the first chamber of the light can take place by means of a flexible insulating and heat-conducting film arranged between the reflector and the housing cover.

The device according to the invention with an integrated operating device can be used universally, in particular for lighting the take-off and landing runways and the taxiway at airports. The construction technique is carried out according to the two-chamber principle of the invention by the separation of the chambers by means of a reflector which, in conjunction with the flexible insulating and heat-conducting foil, serves at the same time for sealing.

In a further development of the invention, the optical unit has a lens and for heating the prism, lens and control electronics, the at least one LED module has additional IR-LEDs with series resistors.

This development of the invention has the advantages that the IR-LEDs fulfil several tasks, namely for de-icing the prism and light channel and for communication as a transmitter, and in that the series resistor (longitudinal resistance) serves for IR-current limitation and at the same time heating.

In one embodiment of the invention, the at least one LED module has a number of LED-chains with a plurality of LEDs and a selection switch connected to the control electronics is provided for an LED-chain drive on the respective LED module.

This embodiment of the invention has the advantage that the selection switch permits selection of the LED-chains for the selection of the respective LEDs and the associated cascading of LED-modules as well permits a redundancy function.

BRIEF DESCRIPTION OF THE DRAWINGS

Further advantages and details can be gathered from the following description of preferred embodiments of the invention with reference to the drawings. In the drawing.

DETAILED DESCRIPTION OF THE INVENTION

Figure 1:
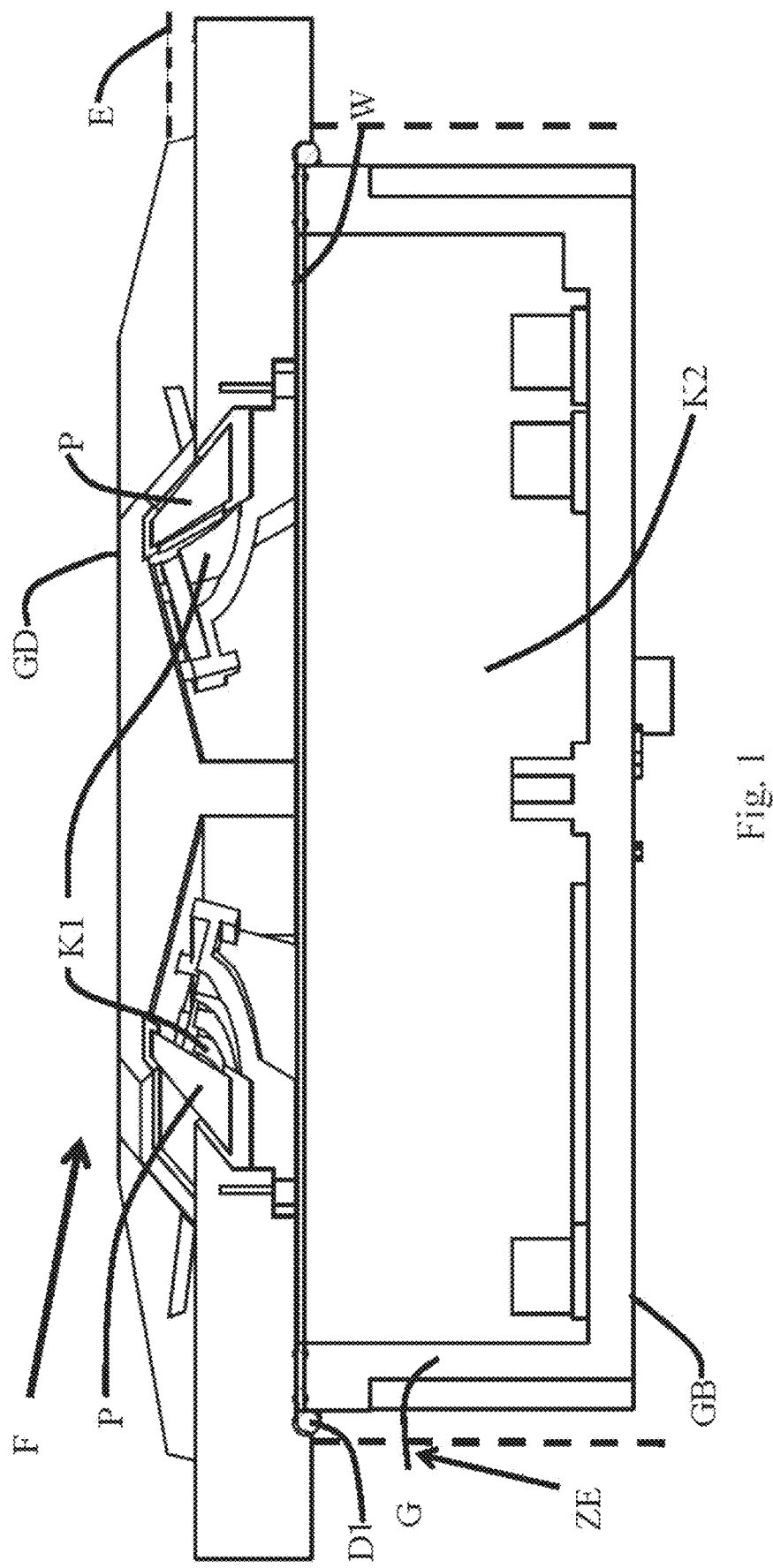
FIG. 1 shows the housing structure according to a two-chamber principle of the device according to the invention with an integrated operating device in section.

FIG. 1 shows in section the construction of the device according to the invention with an integrated operating device, in particular for lighting the takeoff and landing paths and the taxiway at airports, the housing G of which is constructed in accordance with a two-chamber principle. In the following, the application of the device according to the invention as light F, in particular ground light F, for the design with two LED modules LED1 and LED2 and four LED chains (or four dots DT) is explained and described in more detail.

A first chamber K1 of the ground light F contains the optical elements, in particular Lead's LED, the second chamber K2 contains the control electronics KE and cable connections KV. The chambers K1, K2 are separated by an optical unit O (comprising at least one LED module LED1 and a reflector R) and the seal to the housing cover GD takes place in conjunction with an insulating and heat conducting foil I. The insulating and heat conducting foil I placed on the underside of the housing cover GD serves for the electrical insulation and heat dissipation of a control electronics board KB (see the following description). As a result, a seal between the chamber K1 with the at least one optical LED module LED1 and reflector R and the chamber K2 for the electronics is achieved. Together with a seal DP, which seals the end face of a prism P directed towards the light outlet opening GF in the installed state of the optical unit O, and by means of a lens L which is introduced into a recess of the housing cover GD in a sealing manner (in particular glued in), the seal of the light F takes place against external influences, in particular against liquid penetrating from the upper side of the housing cover GD. Furthermore, the separation between the two chambers K1, K2 contributes to the protection of the electronics from penetrating liquid/moisture.

In addition, the chamber K2 can be cast for the control electronics KB, for an even better protection of moisture, and at the same time can be used as a casting mould.

As a result of the construction, the optical unit O (LED modules LED1 to LED4 and reflector R) can be separated and easily reached. Maintenance and service are thereby facilitated. By releasing four screws, namely second and third screws S2 and S3 per optical unit (depending on the embodiment variant) on the inside of the housing G, the optical unit O is accessible, which is mounted on the underside of the housing G. It is thus possible to wait or exchange the entire optical unit O or even individual components of the unit O.

The housing of the ground light F is constructed for receiving up to two control electronics KE and up to eight LED modules (twice LED module LED1 to LED4). As a result, the housing G can be used for all ground lights required in the airport area.

The mechanical positioning of the optical unit O is as follows:

During assembly, the reflector R is first positioned on an LED printed circuit board LP with three locating pins PS (plug-in technique). The latter thus form a unit which is pre-calibrated separately for all three coordinates (X, Y, Z). The three locating pins PS serve at the same time for the reflector R and the LED printed circuit board LP to rest flat on the upper housing part. As a result, the largest possible contact surface of the LED printed circuit board LP with respect to the insulating film I and the heat conducting film is realized. Two screw connections ensure a firm connection between the LED-printed circuit board LP and the reflector R. The at least one LED-module LED1 together with the reflector R forms an optical unit O.

For optimum positioning of the optical unit O on the housing cover GD, the locating pins extend into the position bores of the housing cover GD. The optical unit O is mounted on the housing cover GD with four screws. Two screws pass through the respective LED module together with the LED circuit board LP and the reflector R Two other screws screw the reflector R to the housing cover GD. The reflector R is shaped such that the prism P or its seal D is pressed against a housing window GF. In this way, a good seal termination is produced between the optical unit O and the housing window GF with the prism P or the lens L. This represents the first chamber K1 of the structure.

As described, the reflector R separates the first chamber K1 from the at least one LED module LED1 from the chamber K2 with the control electronics KE. For the optimum vertical angle of the at least one LED module LED1 with respect to the lens L, a flexible insulating and heat conducting foil W is inserted as a base between the LED module LED1 and the housing cover GD. This compensates possibly existing manufacturing tolerances of the components (reflector R, LED printed circuit board LP). Together with the register pins, defined positions are thus achieved and thus the optical pre-calibration of the at least one LED module LED1 is made possible.

In contrast to the conventional devices (for example the ground light described in DE 203 09 405 U1, in which two housings with LEDs and optics are arranged and fastened in a sealing manner in an upwardly open recess of the cover part, the upper side of the two housings forming part of the transferable upper side of the cover part and the light being emitted in opposite directions at an angle to the ground) and the device according to the invention, the optical unit O is mounted with the reflector R on the inside upwards. A further difference lies in the fact that the optical unit O is mounted on the underside of the housing cover GD, which simplifies the service and maintenance by making it possible to exchange LED modules LED1, LED2, . . . without calibration or re-adjustment. As a result of the construction of the ground light F according to the invention, this is insensitive to environmental influences, in particular due to the multiple seals. As in the prior art, see, for example, DE 203 09 405 U1, a pot-shaped, in particular cylindrical insert Z is screwed to the housing cover GD on the solid housing cover GD, in particular made of aluminum, wherein an annular seal D1 is arranged in a groove of the housing cover GD at the abutting surfaces.

The optical unit O consists of five components: prism P, lens L for sensor S, seal DP of the prism P, housing cover GD and LED module LED1, LED2, . . . . The construction of the optical elements LED ensures optimum efficiency of the light characteristic, which corresponds to the specifications of the FAA (Federal Aviation Administration of the United States): Unidirectional light must be aligned so that it crosses the centerline at a point four times the distance of the light; bi-directional dampers must be aligned so that they radiate parallel to the tangent of the curve) and the ICAO (International Civil Aviation Organization): light in curves must have a toe angle of 15.75° to the tangent of the curve).

Figure 2:
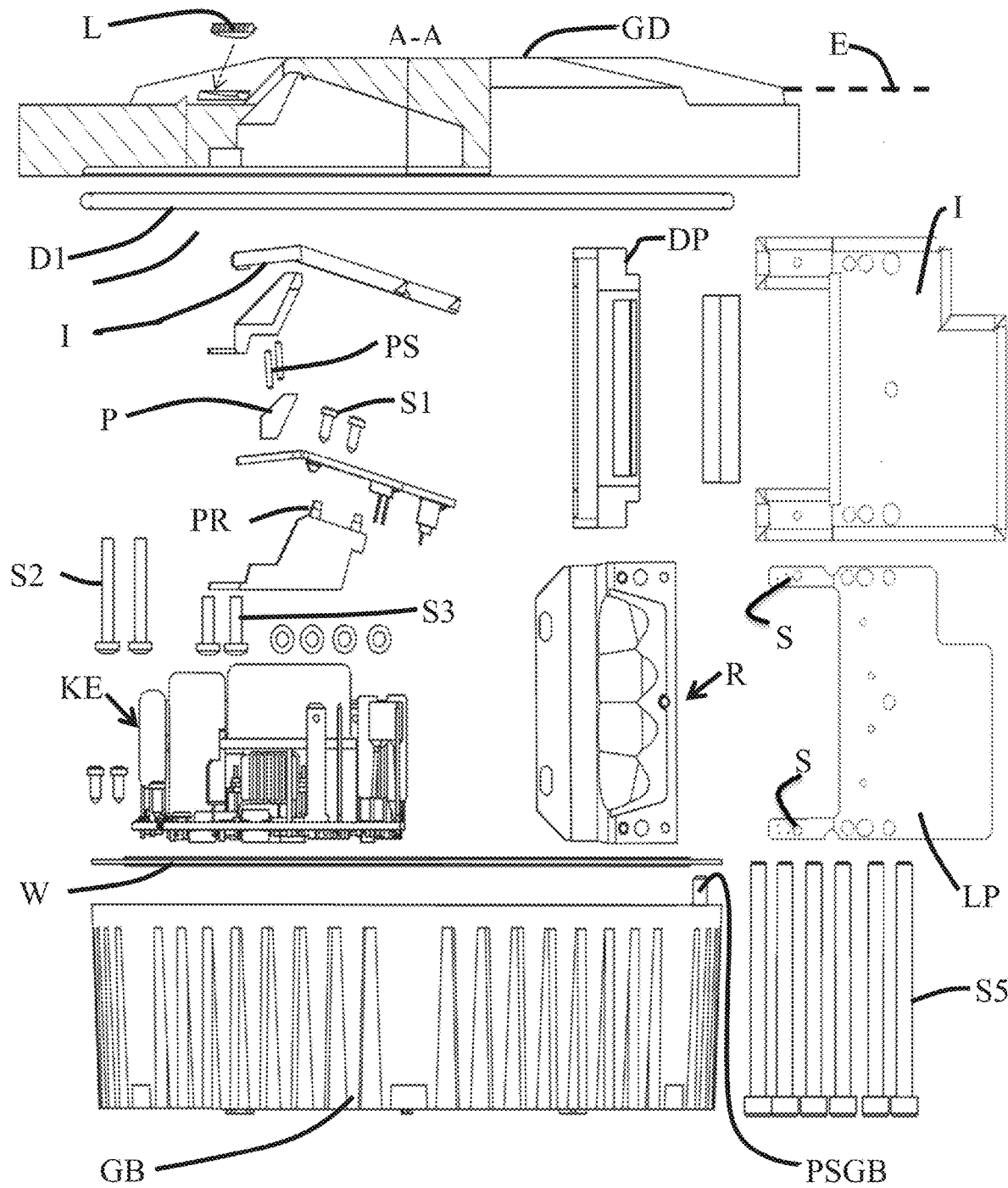
FIG. 2 shows an exploded view of the device according to the invention according to FIG. 1.

FIG. 2 shows an exploded view to illustrate the structural design and the mounting of the device according to the invention according to FIG. 1. In this case, the individual parts in the central region are shown on the left in side view and in the middle and right in plan view.

Figure 3:
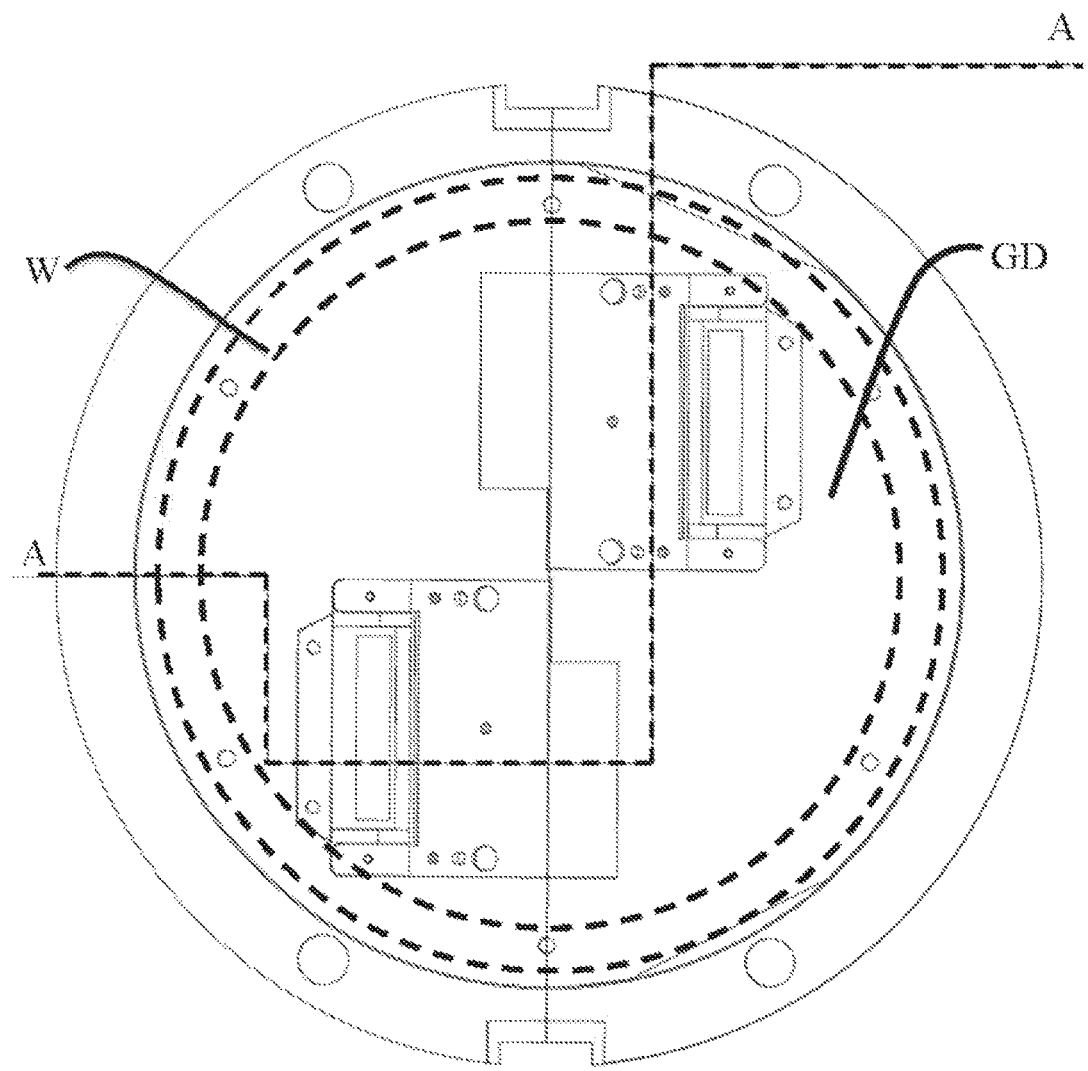
FIG. 3 shows the housing cover without fitted optics of the device according to the invention according to FIG. 1 in a top view from below.
Figure 19:
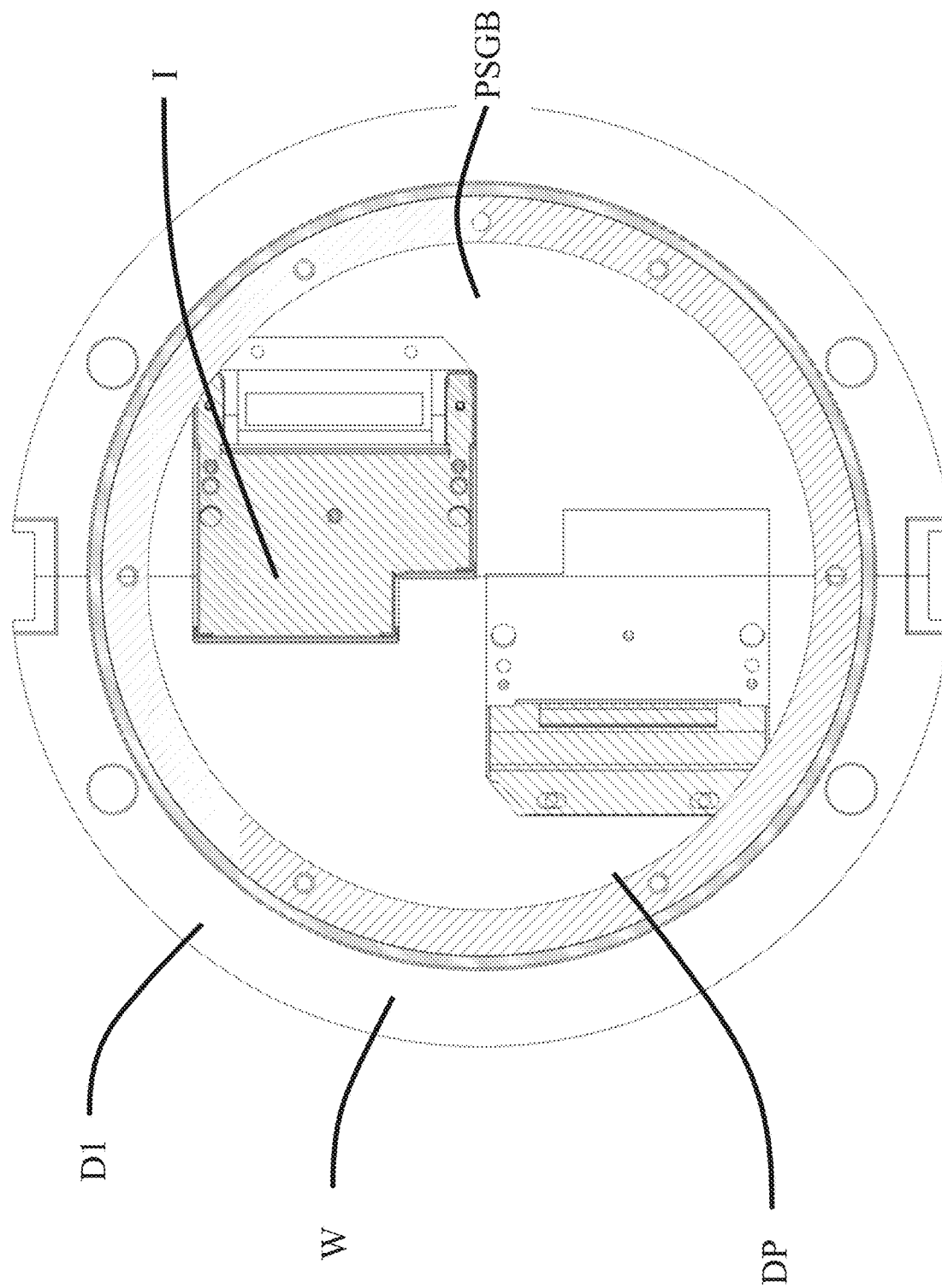
FIG. 19 shows in detail the arrangement of the seals in the housing cover in plan view from below and FIG. 20 shows the block diagram of a short-circuit switch (open lamp relay).

FIG. 3 shows the housing cover GD without fitted optics of the device according to the invention according to FIG. 1 in plan view from below; FIG. 19 shows in detail the arrangement of the seals in the housing cover GD in plan view from below, namely the sealing ring (O-ring) D1 for the cylindrical insert ZE, the flat seal W for the second chamber K2 (shown in broken lines in FIG. 3), the seal DP of the prism P and the insulating and heat conducting foil I.

Figure 4:
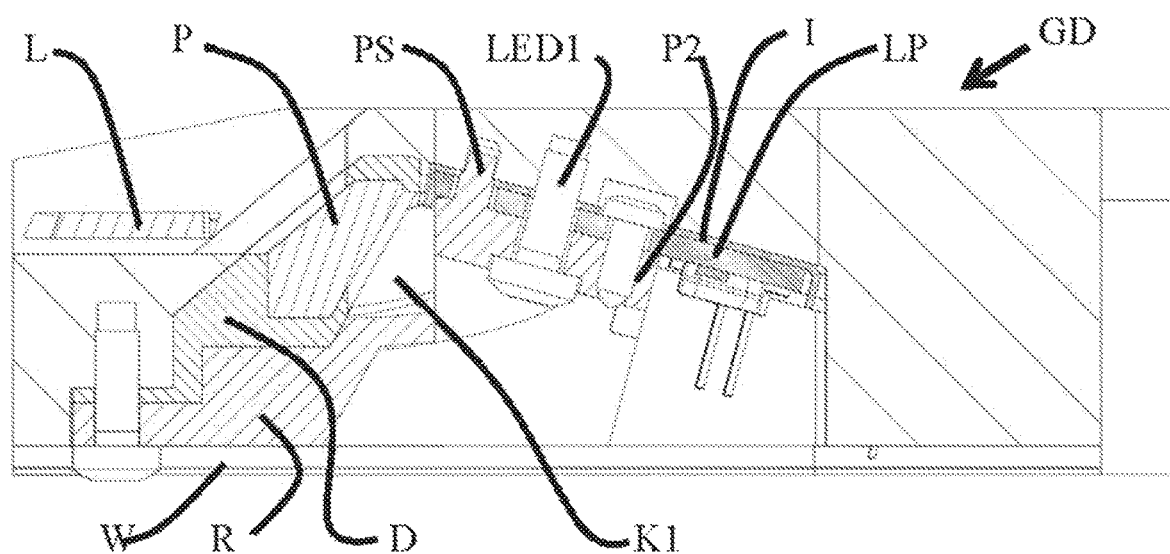
FIG. 4 shows the device according to the invention according to FIG. 1 along the angled section line A-A of FIG. 3.

Furthermore, FIG. 4 shows in detail the device according to the invention according to FIG. 1 along the angled section line A-A of FIG. 3.

Figure 5:
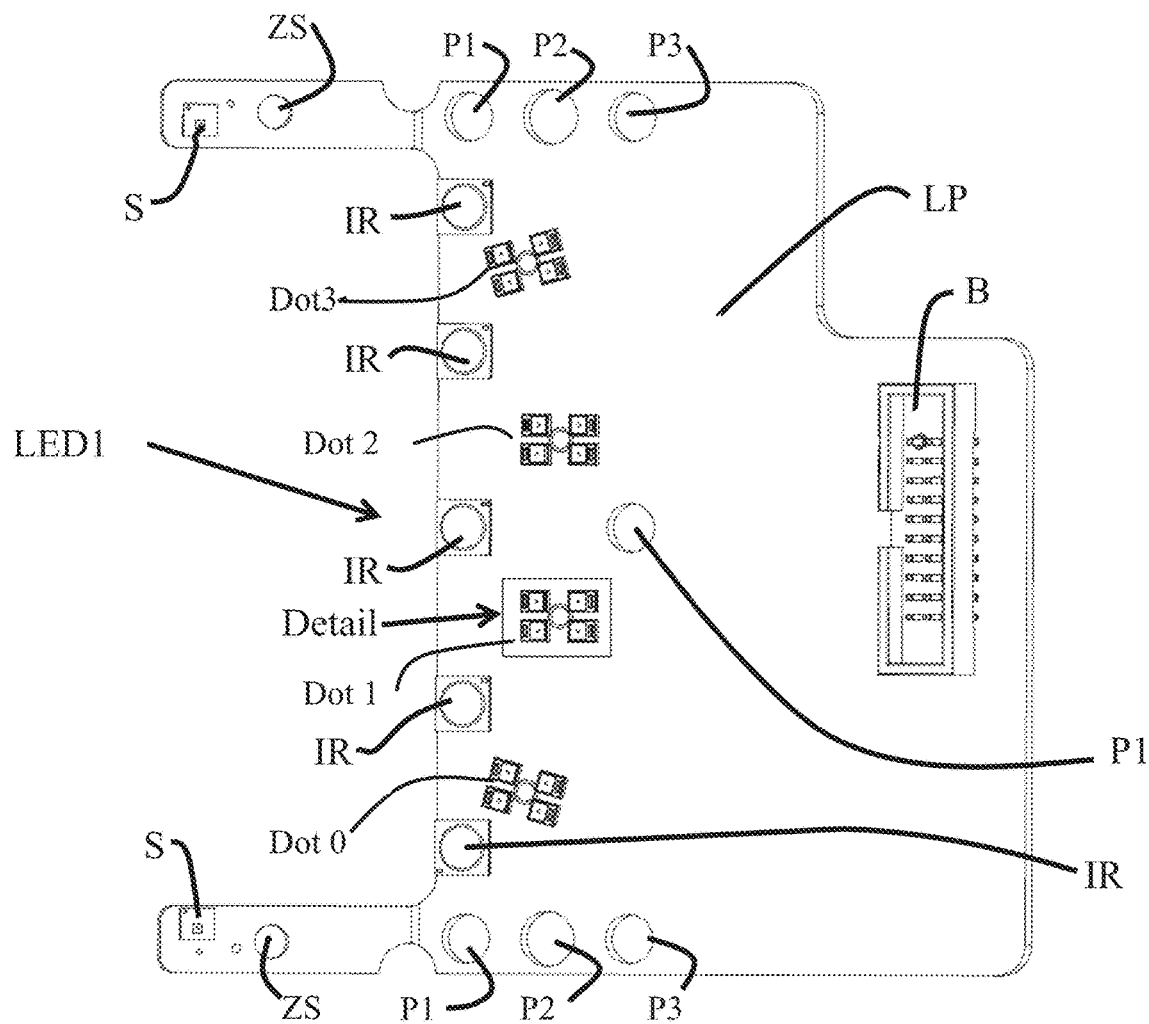
FIG. 5 shows the equipped printed circuit board of an LED module in plan view.

FIG. 5 schematically shows one of the LED modules (e.g. LED1). The connection between the control electronics KE and the LED module LED1 takes place via a ribbon cable KV to form a socket B.

Figure 6:
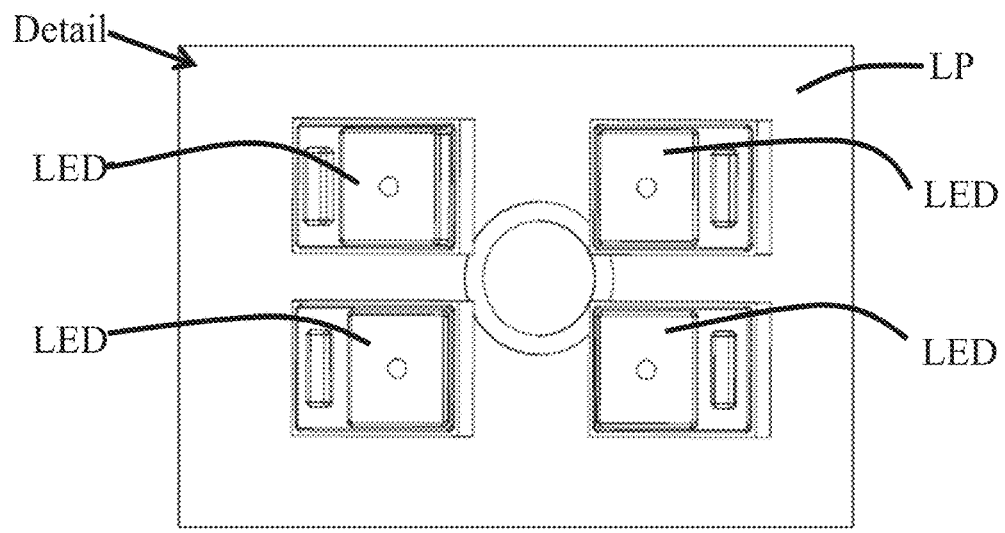
FIG. 6 shows in detail the construction of dots of the LED module according to FIG. 5.
Figure 7:
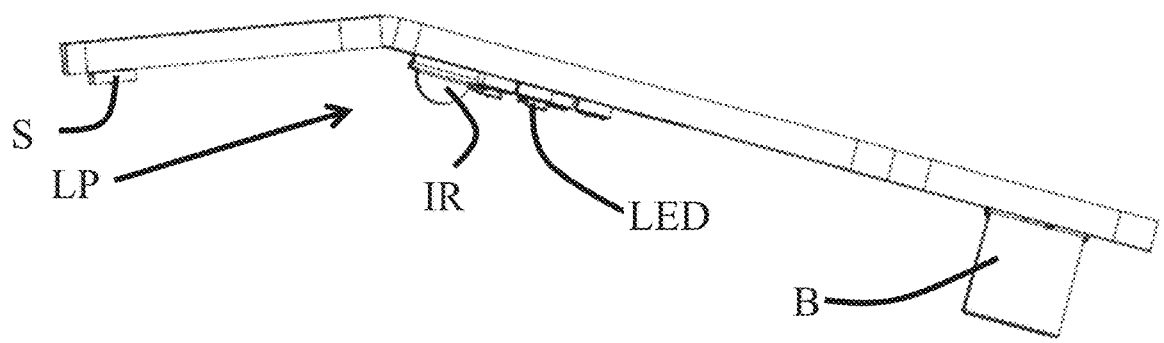
FIG. 7 is a side view of the printed circuit board of an LED module according to FIG. 5.

Four LED-chains each with four LEDs are arranged on the LED module. The LEDs are divided into four groups of four LEDs each. Such a group is called Dot DT. FIG. 6 schematically shows such a dot DT. Depending on the design (fitting) of the LED module (e.g. LED1), a dot DT consists of the LEDs with the colors red, green, blue and white or of a single color. A selection switch AS (X/Y multiplexer) for the LED chain drive on the LED module is provided for an additional flexibility of the LED module. The selection switch AS can be selected from a number of input signals of one and connected through to the output. Different tasks can be fulfilled by individually driving the individual LED chains and the dots DT and the selection switches AS:

RGBW control→all required colors can be realized per dot DT.

Brightness control→It is possible to set different light intensities.

Figure 8:
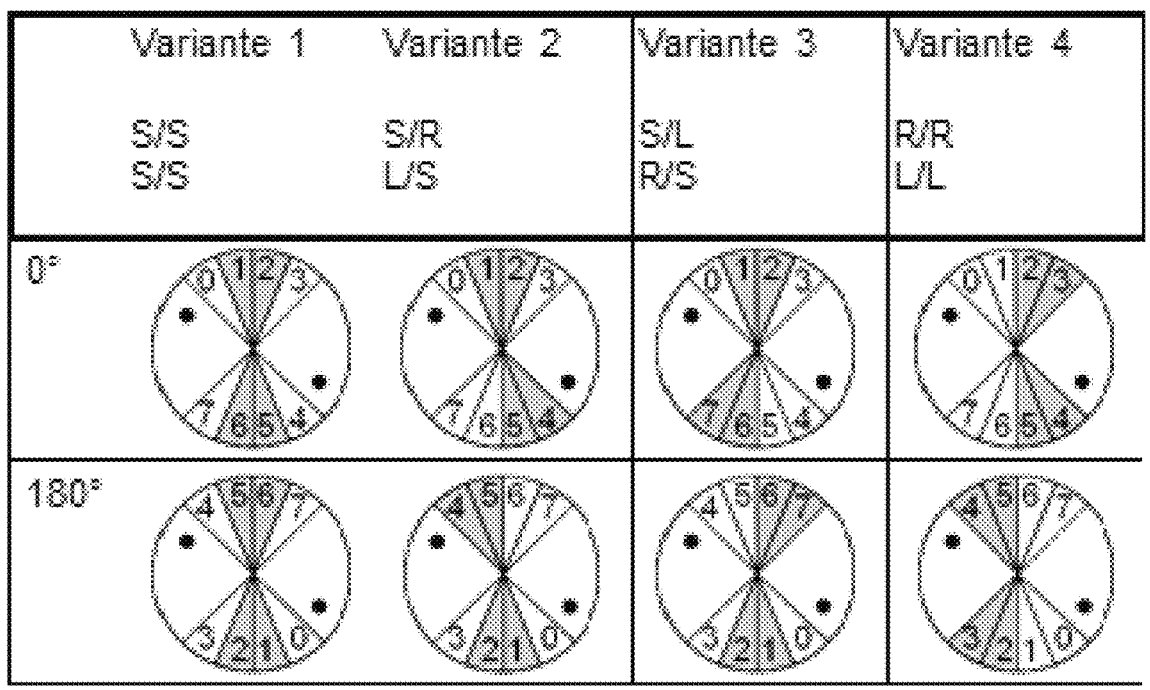
FIG. 8 shows examples of the control of the dots for different lights.

Turn lights can be implemented on and off of dots DT→(see FIG. 8).

Redundancy→Actuation of an LED-chain by means of two control electronics KE.

Redundancy→actuation of up to two LED-chains in a color of an LED module for compensating for a failure of LEDs in an LED-chain.

As a result of this configuration, it is achieved that with a small number of different LED modules LED1, LED2, . . . that many different types of airfield lights can be implemented. This facilitates maintenance and service, since only a small number of different LED modules LED1, LED2, . . . are required.

As a result of the possibility of redundant activation of the LED-chains by means of two control electronics KE, an increased failure safety (redundancy) for airport operation is ensured in the event of a fault, for example a defect in a control circuit or a cable break, etc.

On the respective LED module LED1, LED2, IR-LEDs with series resistors, for example five IR-LEDs IR, are preferably present. These are intended to heat the prism P or the lens L and the electronics KE in order to generate the operating temperature, and to avoid ice formation on the outside of the prism/lens P/L or to melt or to remove moisture (condensation layer on the inside of the glazed surface) in the case of a cold start.

In particular, the IR-LEDs IR can be used as a communication channel for transmission in the IR range, and an RGB sensor S simultaneously serves as a communication receiver (bidirectional IR communication).

Figure 18:
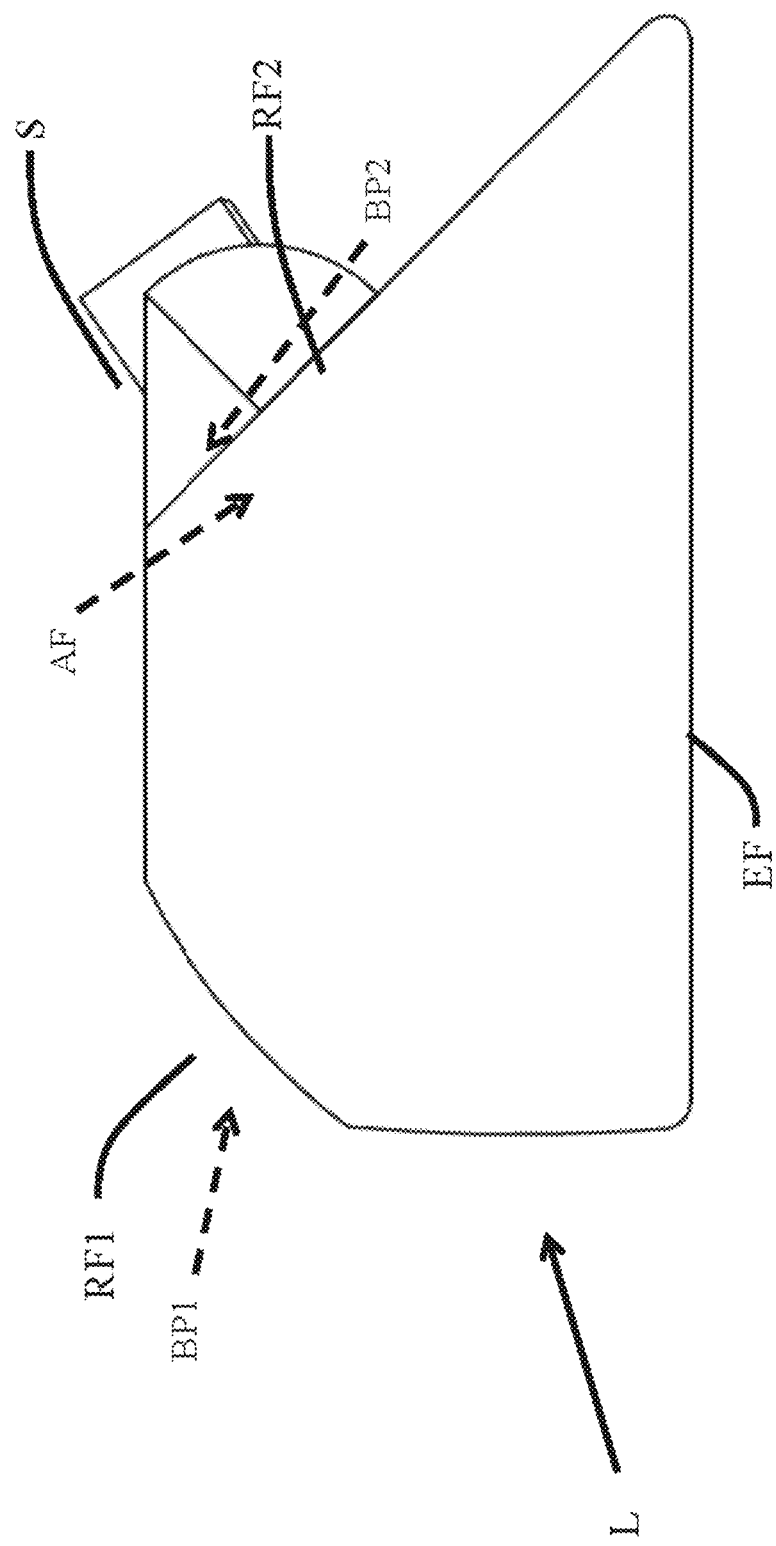
FIG. 18 shows in detail the lens in side view.

On the respective LED module LED1, LED2, . . . two RGB sensors S are preferably placed. The light beam emanating from the light F is collected at the edges of the emitted light beam with two lenses L, preferably convex lens lenses. These each generate a focal point at the respective sensor installation position. As shown in detail in FIG. 18, the lens L consists of an entrance window EF, an exit window AF and two reflector surfaces (RF1, RF2). Both reflector surfaces RF1, RF2 are paraboloid-like with free shapes.

The scattered light of the ground light F enters the entrance window EF of the lens L and is reflected via the first reflector surface RF1 to a first focal point BP1. The first focal point BP1 lies within the second reflector surface RF2. The scattered light collected in the first focal point BP1 is reflected via the second reflector surface RF2 into the second focal point BP2. The second focal point BP2 lies on the sensor surface of the sensor S. Accordingly, the scattered light is directed onto the sensor S in a targeted manner by the lens L.

The RGB sensors S monitor both the light intensity and the wavelength of light to monitor the optical properties for the light F. In the event of deviations, the control electronics KE readjusts the control of the LEDs LED in order to calibrate the deviations (color, brightness).

Since the lenses L are placed on the outside of the housing, interfering variables of the prism P, such as reflections, attenuation, ageing, soiling, extraneous light, etc., are also detected by the RGB sensors S. This enables better calibration of the light beam and provides information on the state of the optical unit O. More precise information can be determined by using two independent RGB sensors S and the possibility for erroneous measurements is minimized.

As a result of the central evaluation of the measurement data from different/adjacent light devices F, the environmental influences can be determined in a separated manner and can flow into the calibration, control of the light. Together with the measurement data of LED current and LED voltage and the temperature (determined using a temperature sensor ST) of the respective LED module LED1, LED2, . . . the aging of the LEDs is determined and calibrated. The sum of this information permits an accurate analysis of the state of the light F. It can be determined whether the prism/lens P/L or the LEDs LED on the respective LED module LED1, LED2, . . . or a contamination is present. Thus, service costs are reduced because only aimed defective components are exchanged and not the complete optical unit O.

In particular, in addition to the optical sensors S and the temperature sensor ST, a moisture sensor SF (see FIG. 12) is arranged on the respective LED module LED1, LED2, . . . . This allows moisture or liquids possibly penetrating to be detected.

Figure 12:
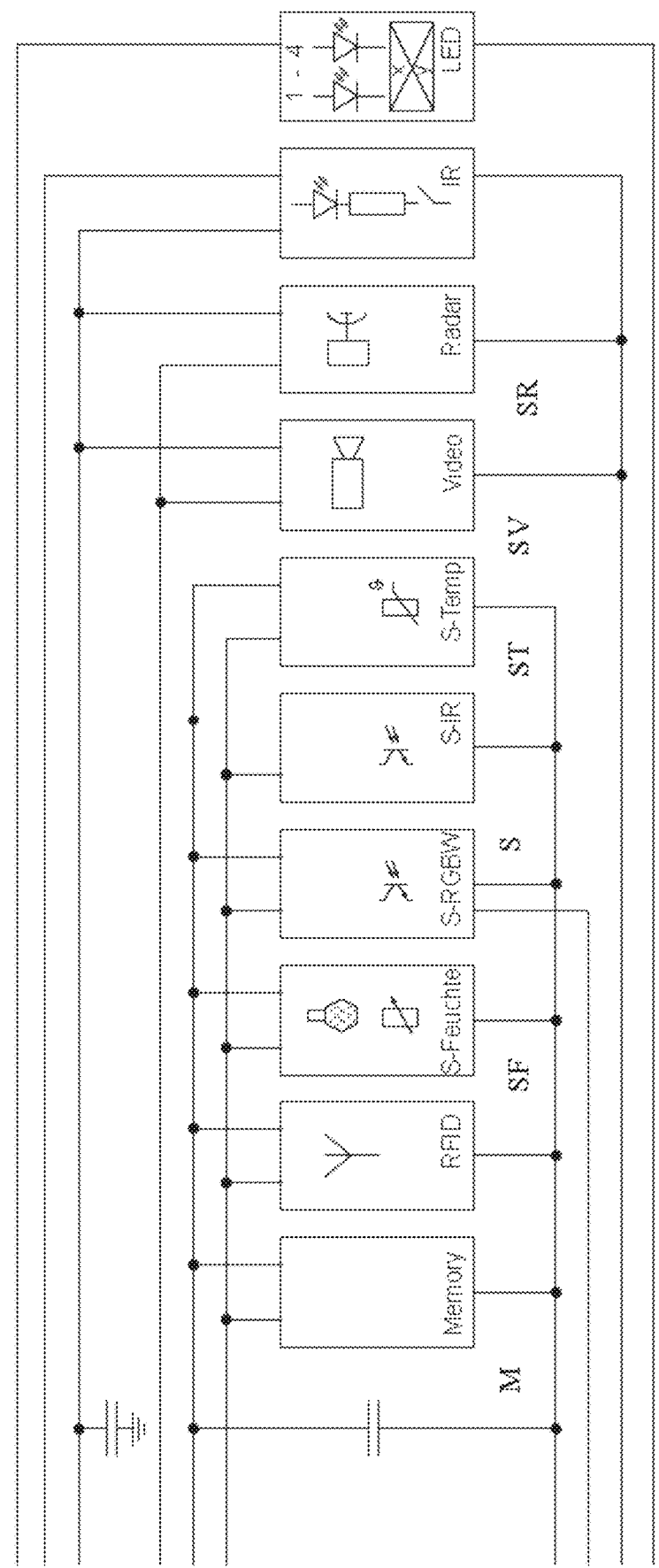
FIG. 12 shows the arrangement of various sensors in the LED module.

Furthermore, as illustrated in FIG. 12, the respective LED module LED1, LED2, having a video sensor SV and/or a radar sensor SR. These makes a targeted monitoring of the flying field possible.

Via an RFID controller and an antenna A integrated into the optical module O, in particular an RFID antenna, the operating data and service data of the ground light F can be read out in situ without opening the light F, and in the off state or without electrical connection to the light F. The wireless communication can preferably be carried out via other radio standards (e.g. Bluetooth, see also the non-prior-published application DE 10 201 6 011 815. 6 of the applicant).

Figure 9:
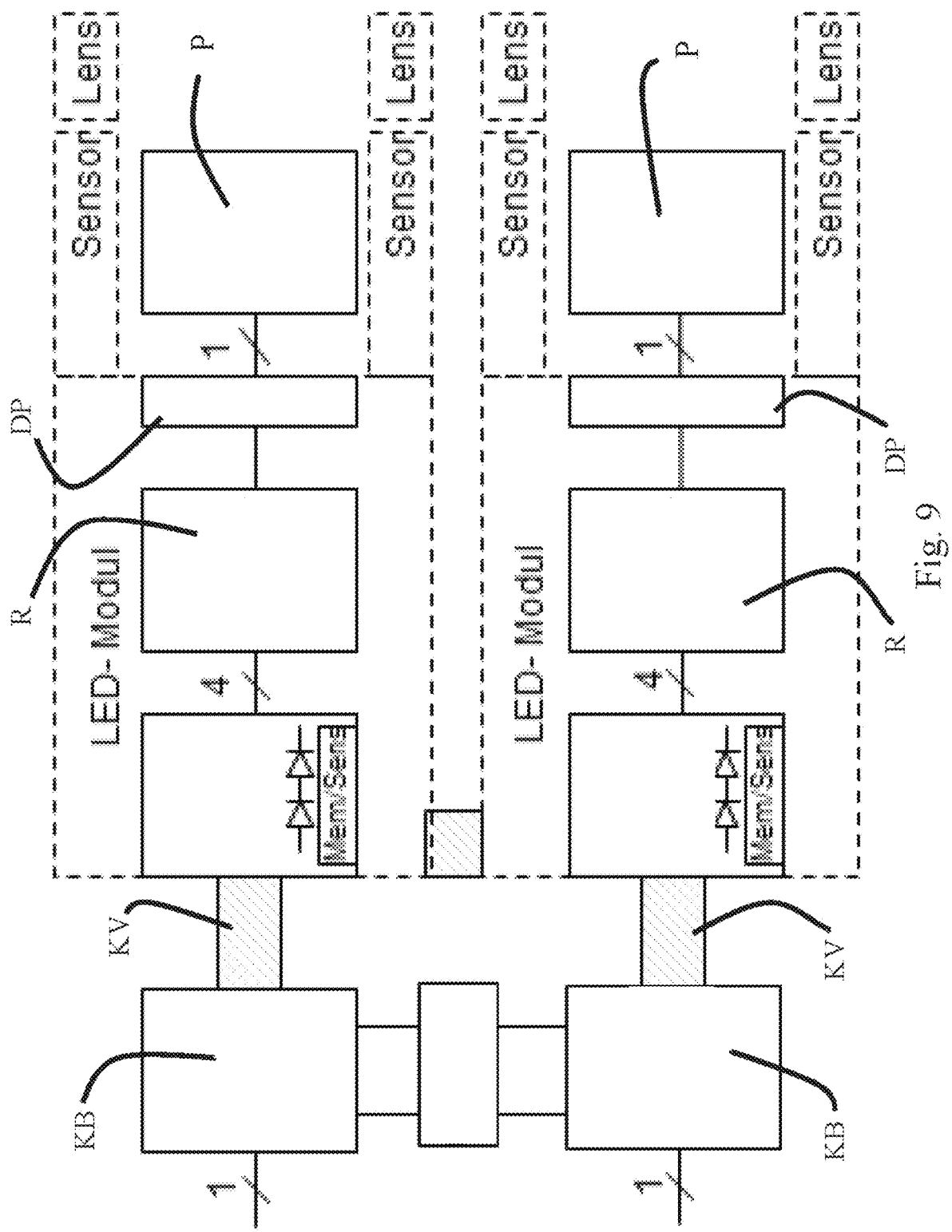
FIG. 9 is a block diagram of the components (electronics+optics) of the light, FIG. 10 schematically shows the structure and arrangement/connection of the components of the device according to the invention.
Figure 10:
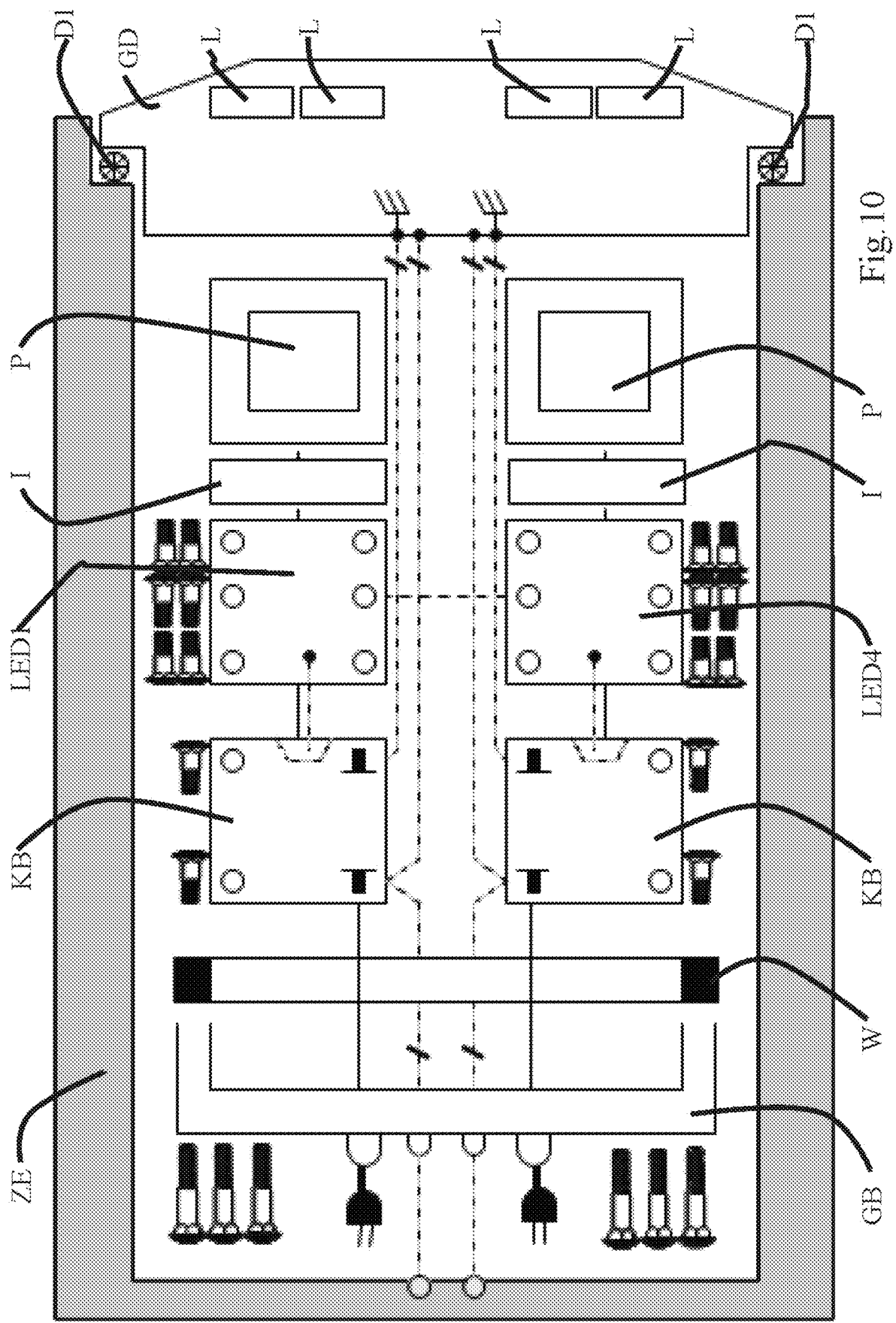

The embodiment/configuration of the respective LED module LED1, LED2, . . . and the operating data and service data are stored in a non-volatile memory M (see FIG. 9, FIG. for reading.

Figure 11:
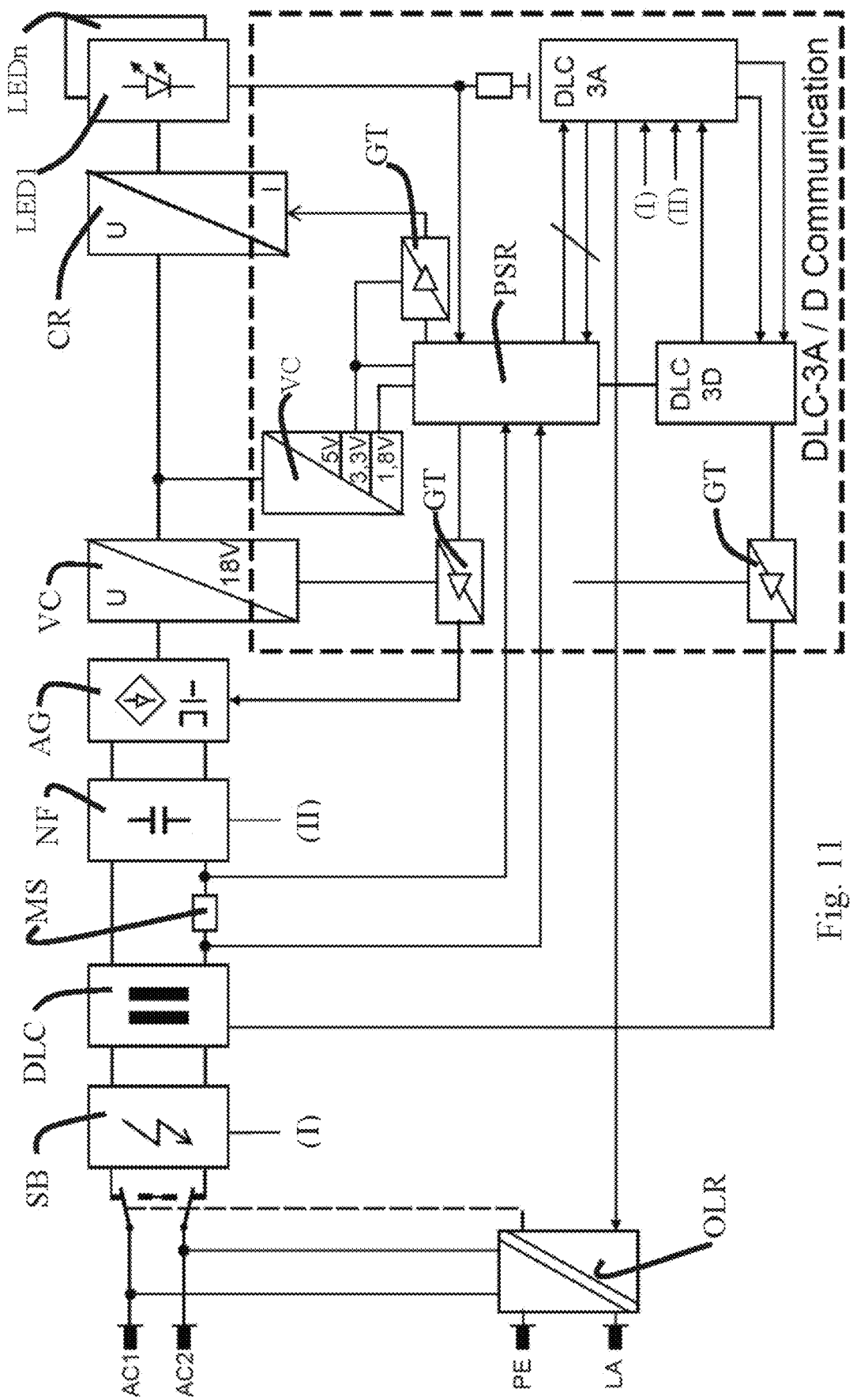
FIG. 11 shows the block diagram for lightning protection, voltage supply and communication of the device according to the invention.

As is shown in detail in FIG. 11, the device/ground light F according to the invention is connected to standardized PLUG-CLASS A plugs via a DLC module DLC, preferably a separating transformer, on the series circuit. The series circuit is supplied by a control device CCR (constant current regulator), not shown in the drawing. Connected between the control device CCR and the series circuit is an MCU (Master Control Unit), not shown in the drawing, which couples the communication signals into a series circuit.

The block diagram shown in FIG. 11 for lightning protection, voltage supply and communication of the device according to the invention is briefly described. An overvoltage and overcurrent protection circuit (lightning protection)

SB is an input-side coarse protection which short-circuits overvoltages and overcurrent occurring at the input of the device and thereby prevents damage to the device. The functionality of the circuit part is monitored by a monitoring circuit and reported to a central controller module DLC-3 A. A module DLC connected to the output of the overvoltage and overcurrent protection circuit (lightning protection) SB ensures the coupling and decoupling of the power line communication signals to the supply network. A measuring shunt MS connected to the module DLC is used to measure the input current of the device. A PS regulator PSR controls and regulates the internal voltage supplies of the device by means of the measurement signal.

Furthermore, a filter F, which represents the network filter of the device, is connected to the module DLC. The network filter F performs the following tasks.

The first object is the interference suppression of the network of internal switching disturbances of the operating device.

The second object is the representation of a high-impedance termination for powerline communication.

The third object is to fold the energy pulses during lightning strike events.

An active rectifier (active rectifier) AG is connected to the mains filter F and generates a DC voltage from the alternating voltage/alternating current on the input side. This is achieved by active control of switches (MOSFETs). The active rectifier AG is controlled by the PS regulator PSR.

A lower power loss of the device is achieved by the lower voltage drop of the switches in contrast to passive rectifier diodes.

A voltage converter VC is connected to the output of the active rectifier AG and generates the supply voltages for the device-internal active components (DLC-3 A, DLC-3 D, etc.) from the rectified voltage. The generation takes place in two stages. A DC voltage is generated from the rectified voltage (e.g. 18V). The lower voltages (5V, 3.3 V and 1.8 V) are generated from this voltage.

The PS regulator PSR is used for controlling the voltage converter VC.

Connected to the output of the voltage converter VC is a constant current regulator CR, which converts the generated DC voltage (e.g. 18V) into a regulated constant current. This is necessary for controlling the subsequent LED-chains. The control takes place via the PS regulator PSR.

The LED modules LED1, LED2, LED2, . . . , which represent the LED-chains of the device, are connected to the constant current regulator CR. A plurality of LED-chains can be controlled and regulated independently of one another by means of the device. An LED-chain may consist of a plurality of LEDs connected in series.

As described above, the PS regulator PSR controls and regulates the various circuit parts of the device according to the invention. For this purpose, the various system parameters (input current, output current, direct voltages, etc.) are measured by the PS regulator PSR and converted into the corresponding control signals.

The central controller module DLC-3 A of the device connected to the PS regulator PSR monitors the functions of the device and is responsible for powerline reception. Furthermore, a powerline amplifier DLC-3 D is connected to the PS regulator PSR and the central controller module DLC-3 A.

Gate drivers GT connected to the output of the powerline amplifier DLC-3 D and the PS regulator PSR convert the drive signals with a low voltage level into drive signals with a higher voltage level. The higher voltage is necessary for the control of active components (MOSFETs).

The dashed line in FIG. 11 is intended to represent the integration of the components within this line in the DLC-3 A/D. The connection of the overvoltage and overcurrent protection circuit (lightning protection) SB and the connection (II) is the connection of the network filter NF to the central controller module DLC-3 A. A short-circuit switch (open lamp relay) OLR is arranged at the input of the overvoltage and overcurrent protection circuit (Lightning Protection) SB, the mode of operation of which is explained in more detail on the basis of the block diagram illustrated in FIG. 20.

The DLC-3 A/D (see dot-line block in FIG. 11 and the non-prior-published application DE 10 201 6 011 815. 6 of the applicant) is the central control, control, monitoring and communication unit of the control electronics KE. The control electronics KE regulates the required LED forward current of the up to four independent LED-chains. The control electronics KE monitor the input current, the input voltage, the LED current, the LED voltage and the supply voltage of the electronics via AD converters integrated in the DLC-3 A/D. Likewise, all sensor data from the DLC-3 A/D (ASIC) are read, monitored and evaluated. Via a powerline communication PLC, the device/ground light F according to the invention can supply this information (sensor data) as well as status messages to the central and superordinate units (see in detail the non-prior-published application DE 10 201 6 011 815. 6 of the applicant).

As shown in FIG. 11, a network filter NF and an overvoltage and overcurrent protection circuit (lightning protection) SB are implemented on a control electronics board KB. For implementation, see in detail the non-prior-published application DE 10 201 6 011 815.6 of the applicant.

The network filter NF is designed as an LC low-pass filter. The overvoltage and overcurrent protection circuit SB consists of:
  Coarse protection
  Current and voltage limiting circuit
  Fine protection The combination of network filter NF and surge and burst protection SB offers protection against electrical environmental influences, such as overcurrent, voltages and lightning strikes. This protection device is monitored by the DLC-3 A/D (ASIC) for high availability of the system. This ensures that a failure of the protection is detected without time delay. Possible reactions are to repair or replace the switching into the redundancy mode or the light F, before damage to the light F and thus a failure of the system occur.

The electronic control system KE contains an automatic heating device in order to pre-heat the assembly during the cold start to the minimum temperature required for components. The heating power is in particular 10 watts for control electronics KE and 10 watts for the respective LED module LED1, LED2, . . . , i.e. 20 watts for the device/ground light F in minimal equipment. This increases the starting temperature of the light F (e.g. in quartz having relatively large frequency offset drift above temperature), as well as the availability and service life of the light F.

Figure 13:
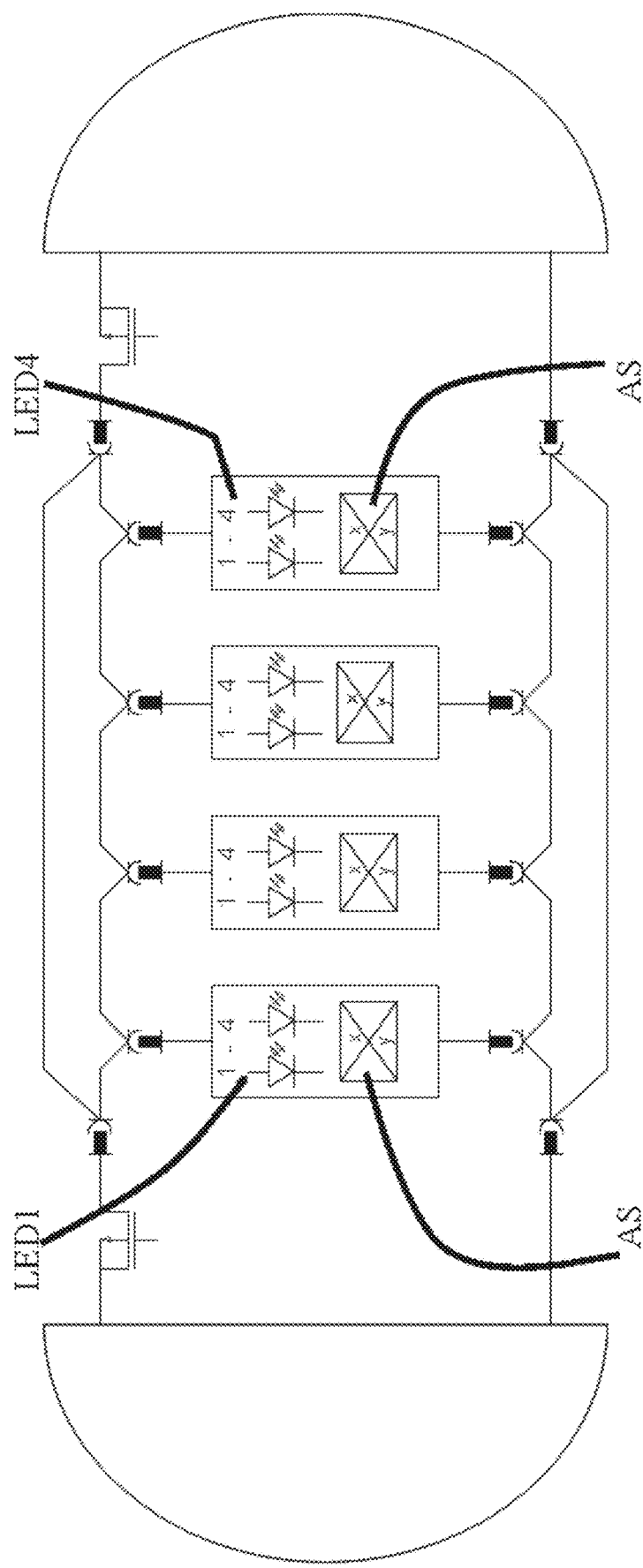
FIG. 13 shows a configuration for the redundant control of the LED modules.
Figure 14:
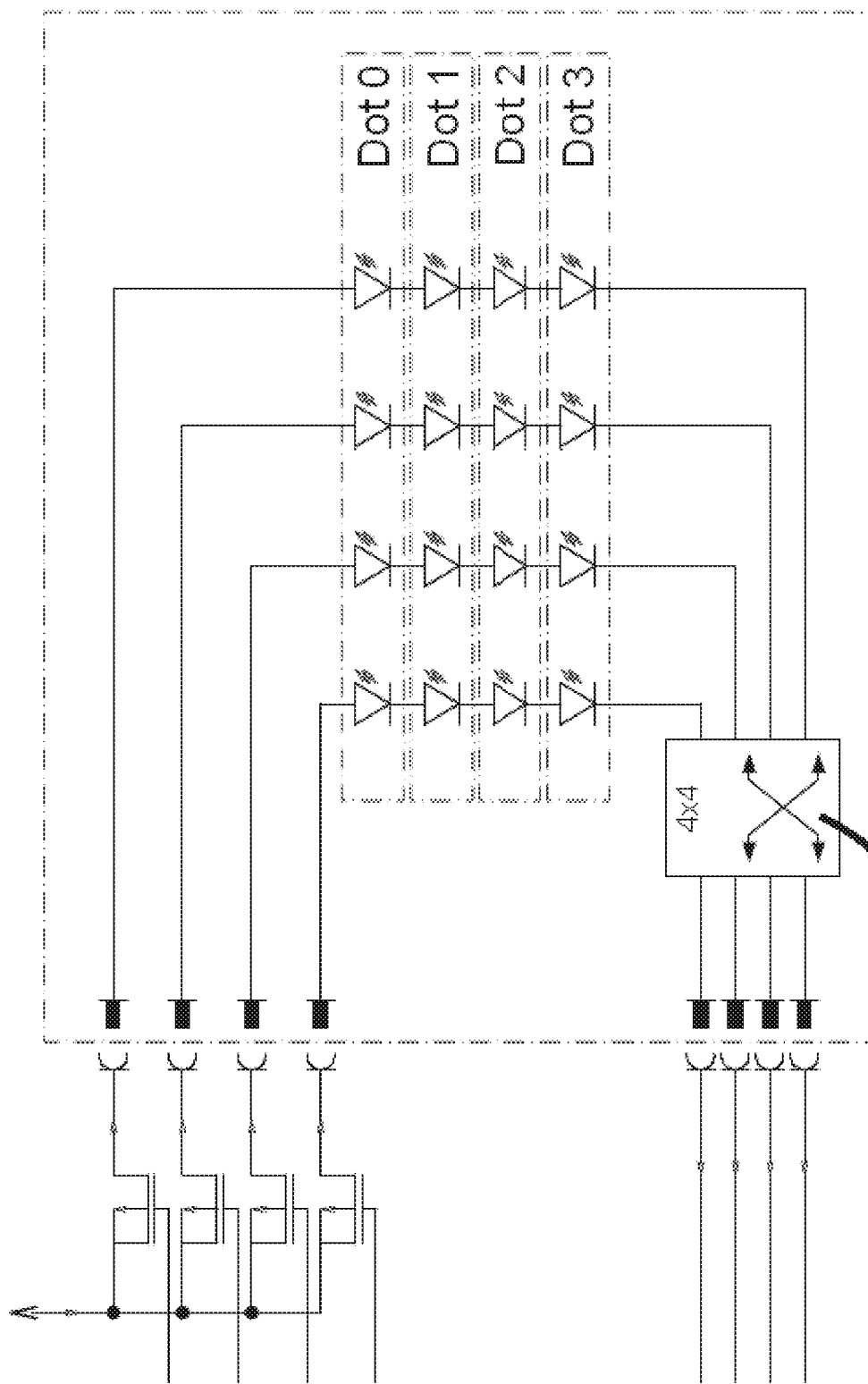
FIG. 14 shows the control of a first embodiment of a serial LED module.
Figure 15:
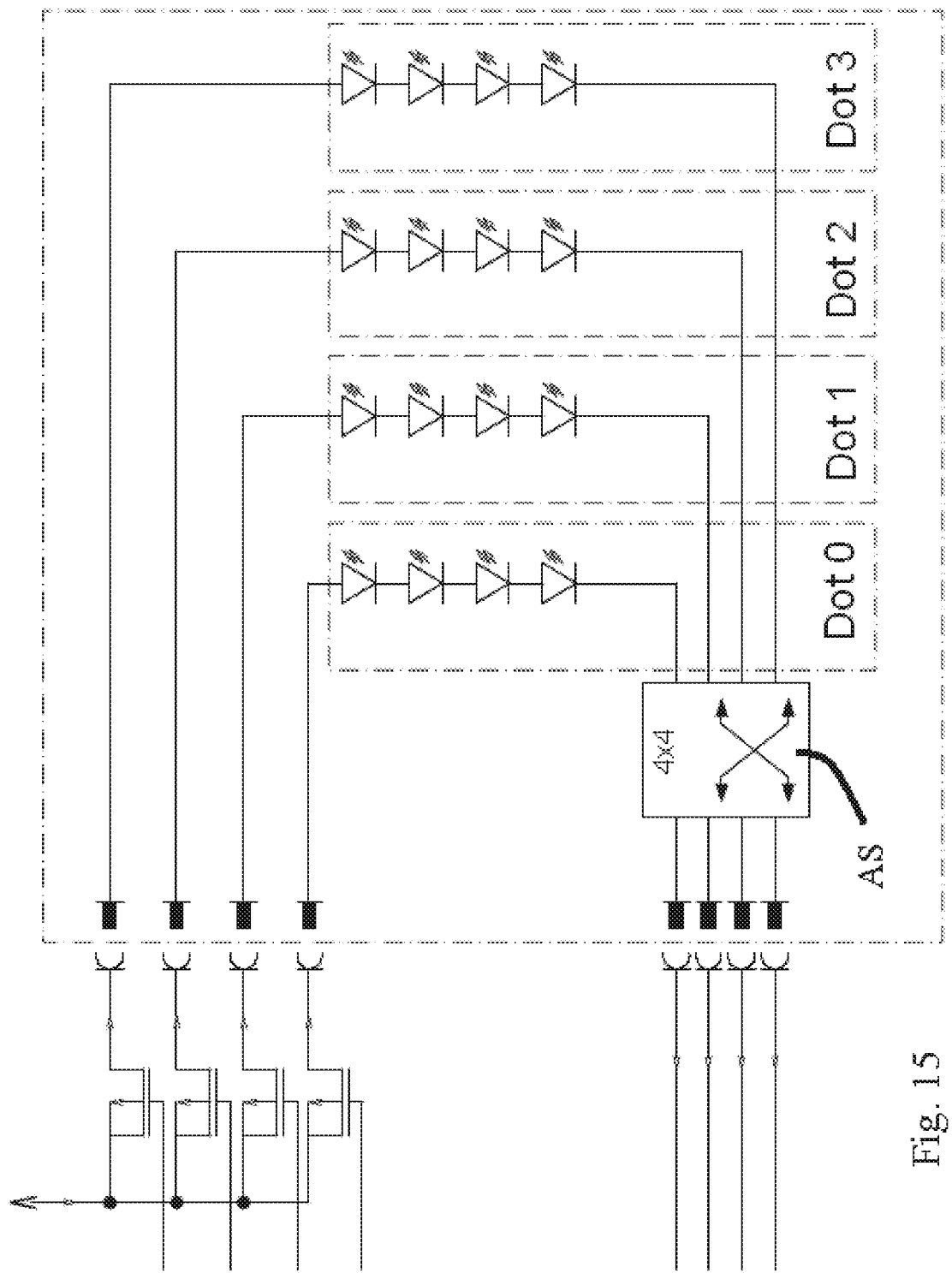
FIG. 15 shows the control of a second embodiment of a serial LED module.
Figure 16:
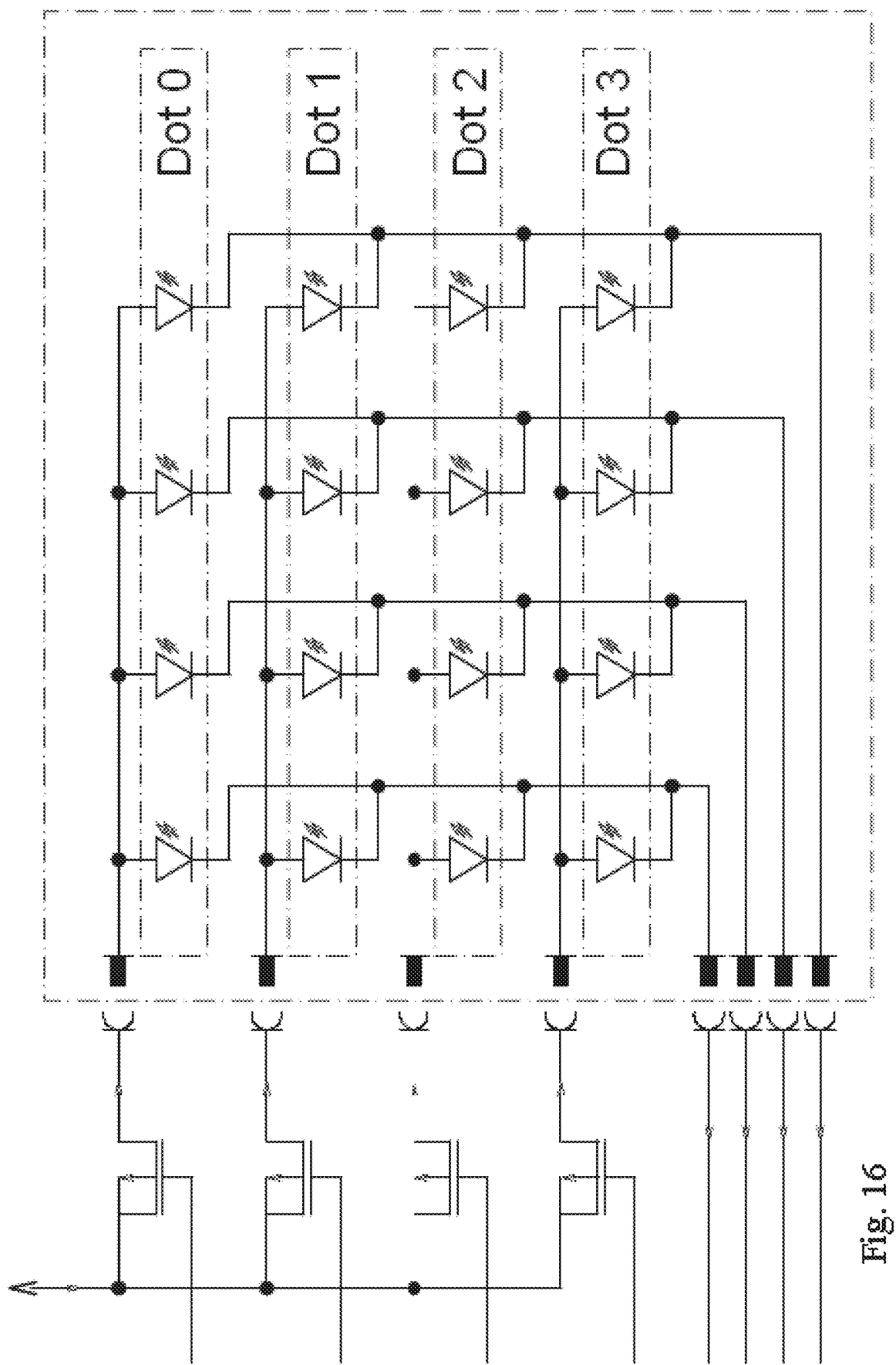
FIG. 16 shows the control of a second embodiment of a parallel LED module of the device according to the invention.
Figure 17:
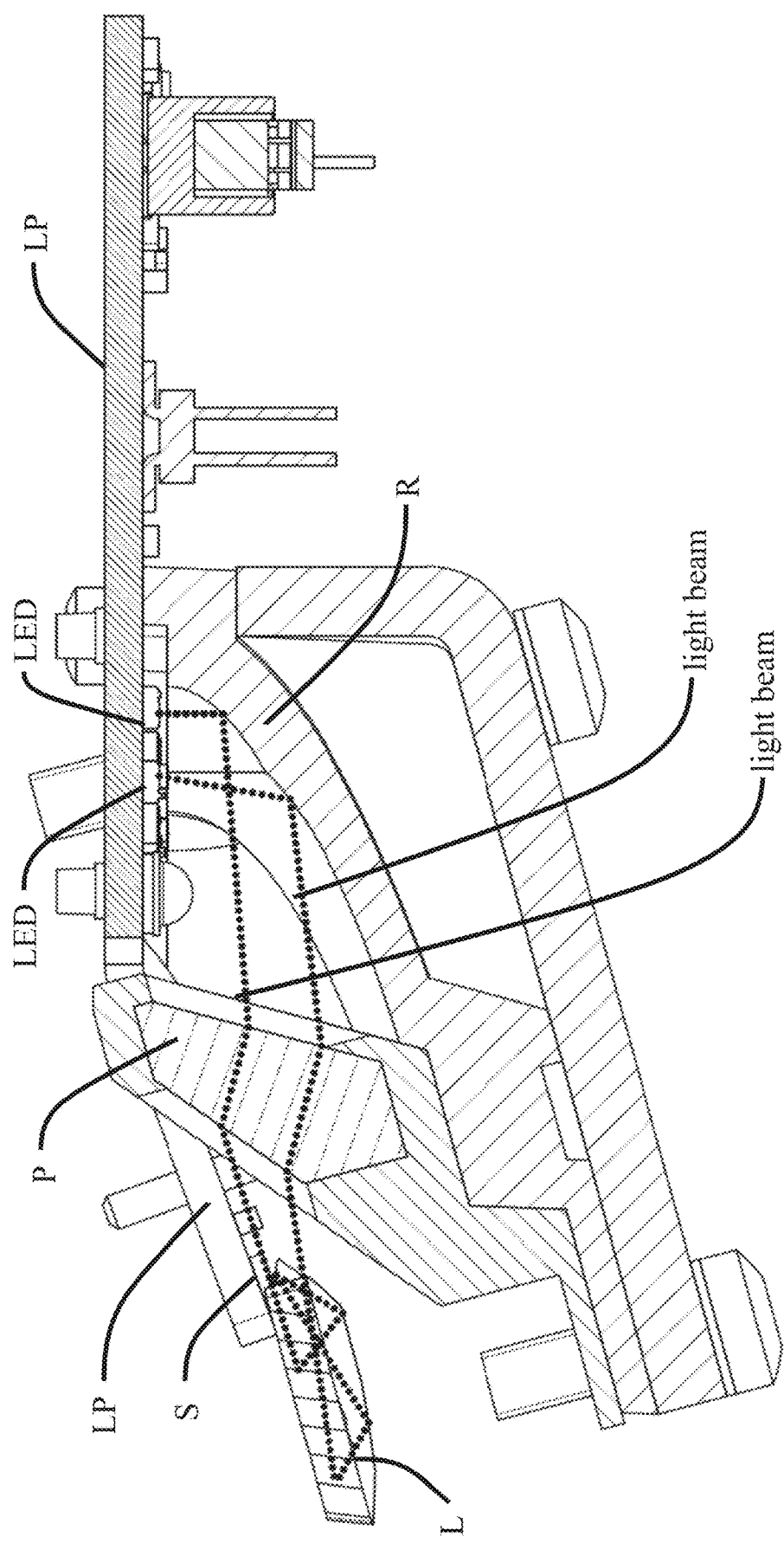
FIG. 17 shows in detail the beam path of the scattered light for two optical units arranged in the housing cover in a sectional view.

As already explained above, it is possible to construct the device/ground light F according to the invention with redundant control electronics KE, see FIG. 13. For this purpose, two control electronics boards KB are required. Each control board KB is connected to the series circuit via a separate separating transformer T. Should a fault occur in the internal power supply of the current regulator for the respective LED module LED1, LED2, . . . or occur a failure of one or more LEDs in the respective LED-chains of LED modules LED1, LED2, . . . with monochrome dots, the redundancy mode is started.

There are three redundancy mode configurations:
1. In the event of a failure of the power supply of a control board KB, the power supply and the communication are taken over by the remaining control board KB. As a result, the first control board KB can continue to operate the connected LED-chains.
2. In the event of a failure of a current regulator for the LED-chains, the second control board KB can assume up to two LED-chains of the first control board KB.
3. In the event of a failure of one or more LEDs in an LED-chain, the latter can be compensated using LED modules with single-color dots by one or more redundant LED-chains.

In addition to the powerline communication PLC, the integrated DLC-3 A/D (ASIC) assumes all open-loop, closed-loop and diagnostic tasks of the device/ground light F. According to the invention, the control electronics KE can make possible the different variants (functions) in conjunction with the optical units O (for example taxiway centerline light or flash-light).

The ground light F is separated from the series circuit by the relay BR arranged at the input of the overvoltage and overcurrent protection circuit (Lightning Protection) SB. As a result of the separation, an additional protection of the ground light F against, for example, overcurrent, overvoltage is achieved in the case described.

In another embodiment, no open secondary circuit is simulated on the transformer T with the relay BR, but the series circuit is short-circuited via the relay contacts at the input of the ground light F.

This short circuit causes the entire system (series circuit) to provide less power for lighting. The CCR is less heavily loaded.

Due to the short circuit, the ground light F is nevertheless separated from the series circuit. With the short circuit, it is likewise achieved that no voltage is present at the input of the ground light F.

The functionality of the external measuring device is no longer maintained here.

For both forms, the relay BR can be reset by manual intervention (application of a voltage to PE (earth) and LA). In this way, the ground light F (if it is functional) can be used again in normal operation. The control line of the bistable relay BR is designated C-ON.

Figure 20:
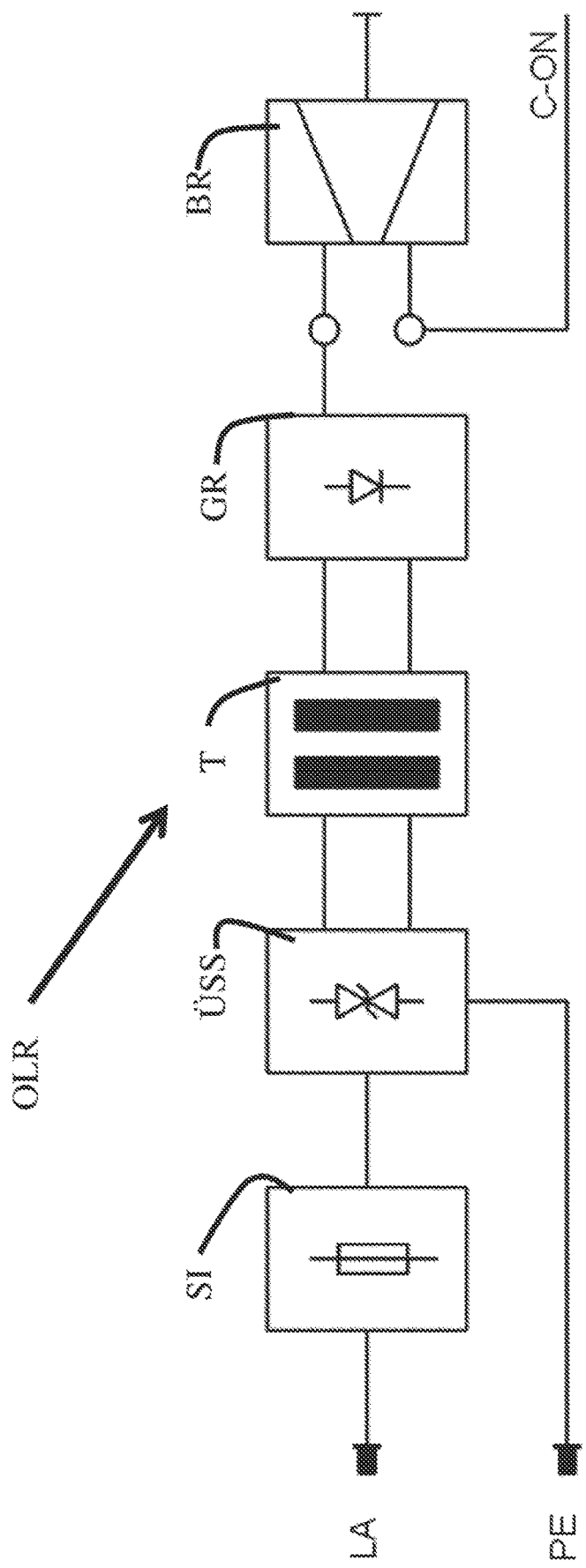

As the block diagram according to FIG. 20 shows, an input LA for resetting the bistable relay BR is protected against overcurrent by means of a fuse SI. Overvoltages between the inputs LA and PE are limited by an overvoltage protection circuit USS.

The applied voltage is galvanically transmitted with a transformer T, which is arranged between the overvoltage protection circuit USS and a rectifier circuit GR. The bistable relay BR is controlled by this transmitted voltage and is thereby reset.

The integrated and intelligent sensor system (RGB sensor S, moisture sensor SF, radar sensor SR, temperature sensor ST, video sensor SV) supplies various decentralized information, which enable self-contained monitoring, error detection and calibration, in addition the information for the central evaluation and monitoring is derived in parallel. The use of the sensor system also reduces the number of variations in production, and reduces maintenance and maintenance costs.

In addition, the device according to the invention/the ground light F makes it possible to use in series circuits without communication while maintaining the correct functionality of external measuring devices in the power supply by simulation (emulation) of the fault image (open secondary circuit from the transformer) of defective halogen lighting means by means of relays at the input and corresponding logic for controlling the relay when the series circuit is switched on.

Furthermore, the invention has hitherto not been restricted to the combinations of features defined in claim 1, but can also be defined by any other combination of certain features of all the individual features disclosed altogether. This means that basically virtually every individual feature in the claims can be omitted or replaced by at least one individual feature disclosed elsewhere in the application.

LIST OF REFERENCE CHARACTERS
APPEARING IN THE DRAWING FIGURES

A antenna (RFID antenna)
AF exit window of lens L
AG active rectifier (active rectifier)
AS selection switch
B bushing (for cable connection KV)
BP1 first focal point of lens L
BP1 second focal point of lens L
BR bistable relay
CR constant current regulation (current regulator)
D1 sealing ring (O-ring) for cylindrical insert ZE
DT Dot 0, Dot 1, Dot 2, Dot 3, . . . .
DLC DLC module
DLC-3A central controller module
DLC-3D powerline amplifier
DP seal prism
E ground level
EF entrance window of lens L
F light (ground light)
G housing
GD housing cover
GB housing-base
GF light passage opening
GR rectifier circuit
GT gate driver
I insulating and heat-conducting film
IR IR-LED (communication, heating)
KE control electronics
KV cable connection
KB control electronics board
K1 first chamber (optical elements LED)
K2 second chamber (control electronics KE, cable connections KV)
L lens
LED optical element
LED1 LED-module
LED2 LED module
LED3 LED module
LED4 LED module
LA input open lamp relay OLR
LP LED printed circuit board
M memory (configuration, operating data, service data)
MS measuring shunt
NF network filter
O optical unit
OF optical Window
OLR short-circuit switch (open lamp relay)
P prism P1 Positioning (locating pin PS) between reflector and LED module and housing cover
P2 bore for screw connection reflector and LED module with housing cover
P3 bore for screw-connection reflector with LED module
PE earth (input open lamp relay OLR)
PR dowel pins with graduation of the reflector R
PS dowel pins of the sensor S
PSR PS regulator
R reflector
RF1 first reflector surface of lens L
RF1 second reflector surface of lens L
S sensor (RGB sensor)
SI fuse
S1 screws for the screw connection of reflector with LED module
S2 screws for the screw connection of reflector and LED module with housing cover
S3 screws for the screw connection of reflector and LED module with housing cover
S4 screws for screwing the control electronics board to the housing base
S5 screws for screwing the housing base to the housing cover
SF moisture sensor
SR radar sensor
ST temperature sensor
SV video sensor
SB overvoltage and overcurrent protection circuit
T transformer (transmitter)
VC voltage converter (voltage converter)
W flat seal (second chamber K2)
ZE cylindrical insert

What is claimed is:

1. A device suitable for lighting take-off and landing runways and taxiways of airports, said device being a light comprising:
    a housing cover provided with a light passage opening;
    at least one light-emitting diode module comprising at least one LED chain having a plurality of light-emitting diodes as light sources, a reflector, and a prism having a shape complementary to that of the light passage opening, the light-emitting diode module comprising an optical system;
    an insert; and
    a sealing ring, which is arranged between the housing cover and the insert;
    wherein on an underside of the housing cover of the light, the at least one LED module and reflector are arranged in a first chamber, which is separated from a second chamber of the light by a seal, and
    wherein a flexible insulating and heat-conducting film is arranged between the reflector and the underside of the housing cover.

2. The device according to claim 1, wherein dowel pins with graduation are provided for positioning the optical system on the underside of the housing cover, said dowel pins extending into position bores of the housing cover, wherein the at least one light-emitting diode module is fastened to the housing cover by a first screw, wherein the optical system is fastened to the underside of the housing cover by means of second and third screws, which are led through the at least one light-emitting diode module, an LED printed circuit board, the reflector and the insulating film, and wherein the reflector is shaped such that, when the second and third screws are screwed in, a seal for the prism arranged in the light passage opening is pressed against an inner edge of the light passage opening of the light.

3. The device according to claim 1, wherein the second chamber is formed by an upwardly open housing base of the insert and contains at least one control electronics and cable connections and is sealed by means of a flat seal, which is arranged on an end face of the housing base and is secured against the underside of the housing cover by screws.

4. The device according to claim 3, wherein a selection switch, which is connected to the at least one control electronics, is provided for the at least one LED chain.

5. The device according to claim 3, wherein dots, which have a plurality of LEDs, are provided on the at least one light-emitting diode module both for emitting monochrome and multicolored light.

6. The device according to claim 5, wherein the at least one LED chain of the at least one light-emitting diode module having the plurality of light-emitting diodes is configured for use both as straight light and as cornering light along straight lines and curves of take-off and landing runways and taxiways by corresponding control of the dots by the at least one control electronics.

7. The device according to claim 1, wherein the optical system has a lens, and wherein the at least one light-emitting diode module has additional IR-LEDs with series resistors.

8. The device according to claim 7, wherein the additional IR-LEDs are configured to function as transmitters in the IR-range, and wherein the at least one light-emitting diode module is configured to function as a communication receiver.

9. The device according to claim 7, wherein light beams emanating from the at least one light-emitting diode module are collected at edges of a beam path of the lens as scattered light, and wherein the collected scattered light is used by at least one sensor for monitoring both light intensity and light wavelength.

10. The device according claim 9, wherein the lens is arranged in a recess on an upper side of the housing cover of the light in a sealing manner such that scattered light beams, which are emitted by the light, hit an entry window of the lens, wherein the lens directs the scattered light beams to a first focal point, wherein the light beams are reflected from the first focal point by a first reflector surface of the lens onto a second reflector surface having a second focal point of the lens onto a sensor surface of the at least one sensor, and wherein all surfaces of the lens except the entrance window and an exit window, are mirrored to the sensor.

11. The device according to claim 10, wherein the at least one sensor is arranged in an elongated part of a printed circuit board, and wherein the elongated part of the printed circuit board has a bore for a centering pin.

12. The device according to claim 1, wherein redundant LED chains are arranged on the at least one light-emitting diode module, which are actuatable redundantly by one or more control electronics.

13. The device according to claim 1, wherein the light is a ground light with redundant control electronics and a switchable and/or redundant power supply.

14. The device according to claim 1, wherein, in order to emulate a halogen lamp, the light has a relay for opening a secondary circuit of a transformer lying in a series circuit including the light.

15. The device according to claim 1, wherein the further comprises one or more of a temperature sensor, a moisture sensor, a radar sensor, and a video sensor.

* * * * *